United States Patent
Garcia et al.

(10) Patent No.: US 10,284,527 B2
(45) Date of Patent: May 7, 2019

(54) SYSTEMS AND METHODS FOR SECURED COMMUNICATIONS

(71) Applicant: THE JOULE GROUP TECHNOLOGY INC., Toronto OT (CA)

(72) Inventors: Juan Martin Garcia, Hoffman Estates, IL (US); Jesse Capon, Toronto (CA); Francis Syms, Toronto (CA)

(73) Assignee: TUMBLE TELL LTD., Toronto (CA)

( * ) Notice: Subject to any disclaimer, the term of this patent is extended or adjusted under 35 U.S.C. 154(b) by 303 days.

(21) Appl. No.: 15/013,570

(22) Filed: Feb. 2, 2016

(65) Prior Publication Data

US 2016/0226836 A1    Aug. 4, 2016

Related U.S. Application Data

(60) Provisional application No. 62/110,768, filed on Feb. 2, 2015.

(51) Int. Cl.
| | |
|---|---|
| *H04L 9/00* | (2006.01) |
| *H04L 29/06* | (2006.01) |
| *G09C 5/00* | (2006.01) |

(52) U.S. Cl.
CPC ............ *H04L 63/0428* (2013.01); *G09C 5/00* (2013.01); *H04L 63/061* (2013.01)

(58) Field of Classification Search
USPC ........................................................ 713/150
See application file for complete search history.

(56) References Cited

U.S. PATENT DOCUMENTS

| | | | | |
|---|---|---|---|---|
| 2003/0108202 A1* | 6/2003 | Clapper | ................ | H04L 9/0872 380/258 |
| 2004/0193902 A1* | 9/2004 | Vogler | .................... | G06F 21/10 713/193 |
| 2008/0069340 A1* | 3/2008 | Vaughn | ..................... | H04L 9/06 380/28 |

(Continued)

OTHER PUBLICATIONS

Frank Miller, Telegraphic Code to Insure Privacy and Secrecy in the Transmission of Telegrams, pp. 1-5 submitted, published in 1882 by Charles M. Cornwell, New York.

(Continued)

*Primary Examiner* — Christopher J Brown
(74) *Attorney, Agent, or Firm* — Norton Rose Fulbright Canada LLP

(57) ABSTRACT

Systems and methods may be provided for constructing and deconstructing encoded messages. A method for constructing an encoded message comprising: providing an unencoded message having one or more unencoded characters; identifying one or more suitable human-readable phrases indexed from one or more codebooks wherein characters from extended character sets are mapped to standard characters having similar appearances to the characters from the extended character sets to create one or more human-readable phrases; selecting a suitable human-readable phrase from the one or more codebooks; and generating an encoded message by mapping the unique and repeating characters of the unencoded messages to the extended character set provided by the selected human-readable phrase. Corresponding systems, and computer system products may be provided.

20 Claims, 38 Drawing Sheets

(56) References Cited

U.S. PATENT DOCUMENTS

| | | | | |
|---|---|---|---|---|
| 2008/0114841 A1* | 5/2008 | Lambert | ................ | G06Q 10/00 |
| | | | | 709/206 |
| 2011/0066437 A1* | 3/2011 | Luff | ...................... | G06Q 30/02 |
| | | | | 704/254 |
| 2014/0282948 A1* | 9/2014 | Anson | ..................... | G06F 21/46 |
| | | | | 726/6 |

OTHER PUBLICATIONS

Prof. Steven M. Bellovin, Compression, Correction, Confidentiality, and Comprehension: A Look at Telegraph Codes, entire article submitted, published 2009 by Prof. Bellovin at Columbia University.

* cited by examiner

| Option 1 | I | ļo̊V̆E | Ψo̊ū |
| Option 2 | I | L̂OΛe | ỷÖu |
| Option 3 | I | i̊Öυë | ẙQ̧U |

FIG. 9

Codebook Function & Example $I_{PHRASE}$ = Please sell all my shares now

Note: In some cases, the Input Phrase may be modified or scrambled to enhance security before being inputted into the system

Phrase Attributes Determined

Phrase Length
$P_L = 29$

Word Sizes
$W1_L=6, W2_L=4,$
$W3_L=3, W4_L=2,$
$W5_L=6, W6_L=3$

Occurrence Rate
$C1_O=3, C4_O=4,$
$C12_O=5, C13_O=1,$
$C15_O=1, C16_O=1,$
$C18_O=1, C19_O=4,$
$C23_O=1, C25_O=1$ Other Phrase Attributes
$AP_{1-N}, AP_{1-N},$ etc...

$f_{CB}$ ($D_L$, 'Phrase Attributes', 'Code Books', 'Desired Attributes', $I_{PHRASE}$)

$D_L$ (desired length)
Desired Attributes
$AD_{1-N}, AD_{1-N}$ etc...

Code Books (may be scrambled)

$CB_{PHRASE}$ = Adults are obsolete children. [METADATA]

Note: In this case, the Dr Seuss™ code book was selected. The output phrase character count is the same as the input phrase character count (excluding the METADATA). The amount of correlation to each input variable is pre-set in the function. The METADATA contains additional information on encoding / decoding

FIG. 22

Using A as an Example to prove out a codebook regeneration.

1. User 1 inserts an A into a message to be encoded
2. User 1 Shares message to user 2 under key 1
3. UTF-8 no. 81 is mapped to A
4. There are 94 priority characters including a space in typed English
5. Each key is provided a unique number UTF-8 that maps to a symbol replacement from 1 to 94. So the key is provided one replacement for capital A at a time and the no. 81 is associated to whichever character in the codebook is in sequence to the needed capital A at that time.
6. The 81 in both users keys maps to the same replacement text character in the codebook and so the message can be unpacked
7. Number letter sequences are updated in the keys by the _____ Server of time and in a random sequence (tbd)
8. So each key has 94 character needs and the equivalent number to be associated. Each time a number in a key is replaces against a UTF-8 character the key regenerates on both devices or within the shared group.

| Letter | T | h | e | r | A |
|---|---|---|---|---|---|
| Number | 25 | 81 | * | * | 81 |
| Position of the needed letter A = 2<sup>nd</sup> character or space in sequence | | | | | 2 |
| Codebook "Yoda" Selected | | | | | |
| Selected quote = | There is no try only do Luke | | | | |

| Mapping to quote | T | h | e | r | * |
| Number "in key associated to UTF-8 Character | 25 | 81 | 34 | 45 | 11 |
| Message Content | C | A | N | — | Y |

FIG. 24

| Step | User A | User B, C, D | User F | IT Admin/ Server | Public Email Server |
|---|---|---|---|---|---|
| 1 | Composes email to User Group. Selects codebook associate with email. Encodes and sends email. | | | Assigns User Group of A, B, C, and D | Accepts email commands and sends out emails to Users A, B, C, D, F. Email content is encoded. |
| 2 | User A's client sends keys to server for User Group. | | | Server sends out codebooks and keys to User Group. | |
| 3 | | Receives keys, codebooks, and email from public email server. Decodes message within client. | | | |
| 4 | | User B replies to all and includes User F (includes codebooks, user group, etc) | | Server sends out codebooks and keys to User Group. | Accepts email commands and sends out emails to Users A, B, C, D, F. Email content is encoded. |
| 5 | | | User F, despite User B's decoding of email, only receives encoded email. | | |

FIG. 25

SYSTEMS AND METHODS FOR SECURED COMMUNICATIONS

CROSS REFERENCE

This application is a non-provisional of, and claims all benefit of, including priority to, U.S. Application No. 62/110,768, entitled SYSTEMS AND METHODS FOR SECURED COMMUNICATIONS, and filed Feb. 2, 2015, incorporated herein by reference.

FIELD

The improvements generally relate to the field of secure communications, and more specifically, encoded communications where the output ciphertext is visually similar to or is a phrase from a codebook.

INTRODUCTION

Individuals may be communicating across existing media platforms and may wish to utilize these existing platforms to send secured and/or encoded messages. However, a challenge may be that the existing platforms may restrict and/or does not provide such capabilities.

Further, an individual may wish to utilize ciphertext that is not meaningless to humans, and also, may not be readily identifiable as ciphertext. The encoding of messages may be desirable for various reasons, such as an increased level of security, privacy, monetization capabilities, tracking and/or monitoring capabilities, decreased machine-readability and generally to protect and inform an added layer of cyber security etc.

Accordingly, there may be a need for systems and methods for securing communications, as it relates to communications between various individuals and/or entities across one or more communications means.

SUMMARY

In accordance with an aspect, there is provided a computer implemented system to generate an encoded message, the encoded message comprising a plurality of electronic characters that form one or more human-readable phrases, the computer implemented system having a processor, non-transitory computer readable memory, and a data storage, the non-transitory computer readable media having instructions stored thereon, which when executed by the processor, cause the processor to: access or receive an unencoded message having one or more unencoded characters formatted based on a standard character set having standard characters; process the unencoded message to extract one or more unencoded message phrase attributes; identify one or more phrases indexed from one or more codebooks stored on the storage based at least on matching a length of the unencoded message to a length of the one or more phrases; process the identified one or more phrases to extract one or more sets of phrase attributes, each set of the one or more sets of phrase attributes corresponding to one of the one or more phrases; select one of the one or more phrases by conducting a comparison of the one or more unencoded message phrase attributes to the sets of phrase attributes; map extended characters from one or more extended character sets to the standard characters in a first mapping, the first mapping establishing linkages between standard characters and extended characters from the extended characters that are visually similar to one another; establish a second mapping between each of the one or more unencoded characters and a corresponding extended character that is mapped to the standard characters that compose the selected phrase, the second mapped based on a key; and replace the characters of the selected phrase using the second mapping to replace the characters with corresponding extended characters, such that following replacement of all the characters of the selected phrase, a visually similar output phrase is provided that is composed of mapped extended characters.

In another aspect, the selected phrase is preprocessed to replace repeating characters of the selected phrase with extended characters such that following pre-processing, the selected phrase contains no repeating characters.

In another aspect, the mapping of extended characters from one or more extended character sets to the standard characters includes associating with the linkage a readability factor indicative of how visually similar an extended character is relative to the standard character upon which the extended character is mapped to.

In another aspect, the second mapping is established based at least on a minimum threshold readability factor between mapped unencoded characters and corresponding extended characters.

In another aspect, the instructions further instruct the processor to construct one or more messages to be transmitted on a media network.

In another aspect, the instructions further instruct the processor to append one or more advertising messages on to the encoded message.

In another aspect, selecting a phrase from the one or more codebooks includes scrambling the one or more codebooks by applying one or more numerical factors.

In another aspect, messages or keys may be location sensitive and may not open based on an identified location.

In another aspect, messages or keys may be location sensitive and may change their output based on an identified location.

In another aspect, selecting one of the one or more phrases includes determining which of the one or more phrases is most statistically correlated to a topic otherwise being discussed in a communication link, and selecting that phrase.

In another aspect, there is provided a computer implemented method for generating an encoded message, the encoded message consisting of a plurality of electronic characters that form one or more human-readable phrases, the method comprising: accessing or receiving an unencoded message having one or more unencoded characters formatted based on a standard character set having standard characters; processing the unencoded message to extract one or more unencoded message phrase attributes; identifying one or more phrases indexed from one or more codebooks based at least on matching a length of the unencoded message to a length of the one or more phrases; processing the identified one or more phrases to extract one or more sets of phrase attributes, each set of the one or more sets of phrase attributes corresponding to one of the one or more phrases; selecting one of the one or more phrases by conducting a comparison of the one or more unencoded message phrase attributes to the sets of phrase attributes; mapping extended characters from one or more extended character sets to the standard characters in a first mapping, the first mapping establishing linkages between standard characters and extended characters from the extended characters that are visually similar to one another; establishing a second mapping between each of the one or more unencoded characters and a corresponding extended character that is mapped to the standard characters that compose the selected phrase, the second mapped based on a key; and replacing the characters of the selected phrase using the second mapping to replace the characters with corresponding extended characters, such that following replacement of all the characters of the selected phrase, a visually similar output phrase is provided that is composed of mapped extended characters.

In another aspect, there is provided a non-transitory computer-readable media configured for using extended character sets and one or more codebooks to generate an encoded message for transmission across a communication medium, the encoded message consisting of a plurality of electronic characters that form one or more human-readable phrases, the non-transitory computer-readable media having instructions stored thereon, which when executed by a processor, cause the processor to: access or receive an unencoded message having one or more unencoded characters formatted based on a standard character set having standard characters; process the unencoded message to extract one or more unencoded message phrase attributes; identify one or more phrases indexed from one or more codebooks based at least on matching a length of the unencoded message to a length of the one or more phrases; process the identified one or more phrases to extract one or more sets of phrase attributes, each set of the one or more sets of phrase attributes corresponding to one of the one or more phrases; select one of the one or more phrases by conducting a comparison of the one or more unencoded message phrase attributes to the sets of phrase attributes; map extended characters from one or more extended character sets to the standard characters in a first mapping, the first mapping establishing linkages between standard characters and extended characters from the extended characters that are visually similar to one another; establish a second mapping between each of the one or more unencoded characters and a corresponding extended character that is mapped to the standard characters that compose the selected phrase, the second mapped based on a key; and replace the characters of the selected phrase using the second mapping to replace the characters with corresponding extended characters, such that following replacement of all the characters of the selected phrase, a visually similar output phrase is provided that is composed of mapped extended characters.

In accordance with another aspect, there is provided corresponding systems, and computer systems products, including non-transitory computer readable media having machine-readable instructions stored thereon.

Many further features and combinations thereof concerning embodiments described herein will appear to those skilled in the art following a reading of the instant disclosure.

DESCRIPTION OF THE FIGURES

In the figures:

FIG. 9 is a sample table illustrating UTF-8 character options that may be used for encoding the phrase "I love you", according to some embodiments.

FIG. 22 is an example workflow where $f_{CB}$ is applied in the example of FIG. 21, illustrating some inputs that may be used by $f_{CB}$ in selecting a phrase and/or metadata from the codebook, according to some embodiments.

FIG. 24 is an example workflow where a particular letter, "A", is to be encoded in a message between two users having a shared key, and the letter is mapped to a UTF-8 character, according to some embodiments.

FIG. 25 illustrates an example workflow where the system is used to provide email confidentiality, according to some embodiments.

DETAILED DESCRIPTION

Figure 1:
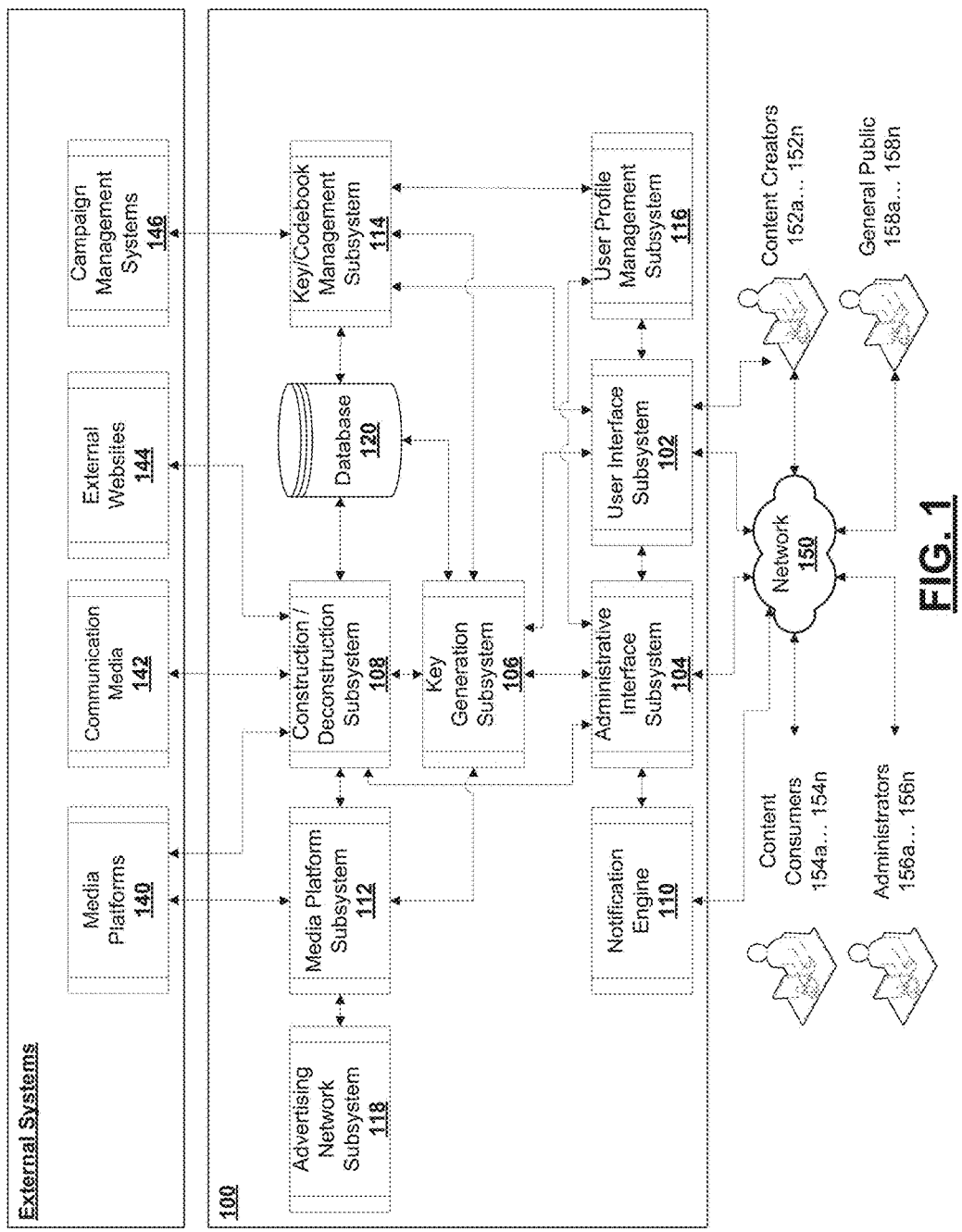
FIG. 1 shows an example of a system, according to some embodiments.

In some embodiments, systems and methods may be described that provide encoded and decoding capabilities used to engage in private and/or selective communication on a communication medium.

For example, encoding may be utilized to encrypt information to be shared on a public network or private network, allowing only those with the proper decoding tools (e.g., keys, codebooks) to be able to decipher the message. There may be various systems and methods described to construct, deconstruct and/or output messages in relation to the encoding technique utilized. Encoding may include, for example substitution, encryption, etc.

In some embodiments, the output messages may also be transformed into a human-comprehensible message that may utilize, for example, expanded character encoding formats (e.g., UTF-8, extended ASCII, ISO-8859-1, UTF-16, UTF-32) in developing a set of messages that may be recognizable to a human, but may be difficult for a machine to interpret/decode. These character standards may be expanded as compared to standard character formats, such as the American Standard Code for Information Interchange (ASCII), and UTF-8 may be particularly advantageous as UTF-8 is a widely adopted encoding standard that is in use across the Internet. Other encoding schemes may be contemplated.

In some embodiments, the capabilities of the expanded character encoding formats may be utilized in mapping unique characters to otherwise repeating letters in the original text (e.g., mapping 'o' to the first 'o', and 'Ö' to the second 'o'). Codebooks and/or other source libraries may be used to map input messages to 'proxy' human-readable messages, for example, mapping a user's input message to a sentence from a book or a song. Codebooks and/or other source libraries may include, for example, songs, books, advertising messages, etc. The process will algorithmically assess and adjust characters and phrases to maximise human readability.

For example, this replacement text may provide a potentially less invasive to the user experience by a content creator or a content consumer, as compared with posting conventional ciphertext (e.g., hexadecimal replacement number systems). Accordingly, users may wish to use ciphertext that may be comprised of intelligible phrases that may, for example, be selected from a content creator's favorite songs, books, etc. These phrases may be stored in codebooks, which may be sold, traded, earned, etc.

Systems and methods for encoding/decoding messages may be provided at various stages of the generation and/or transmission of communications, such as at a device level, an operating system level, a network level, etc. The system and methods may be designed to interoperate and/or integrate with various communication media or communication channels, such as media platforms, social networks, email, websites, web forums, etc. The systems and methods, in some embodiments, may be configured such that the encryption is conducted at end-points, rather than at the communication channel level, potentially allowing the systems and methods to be medium-agnostic.

The construction, transmission and/or deconstruction of encoded/decoded messages may be described in various embodiments. Encoding may, for example, include the substitution of characters with extended character set characters that may appear to be similar to the characters to a human reader, but may appear to be different characters to a machine interpreter; encryption of a message using various encryption techniques (e.g., public key/private key architectures); using hashing functions to map inputs (encrypted or unencrypted) to one or more characters from phrases in a codebook; and/or using a scrambling function to be applied to one or more codebooks. Encoding may include the encoding of the whole or part of a message. For example, a user may select to send a portion of the message in an unencoded format.

Accordingly, in an embodiment, an important feature for consideration is the readability of encoding (e.g., encryption) wherein the ciphertext itself is provided in the form of human interpretable or quasi-human interpretable words. This may provide a distinction and a different user experience from that of using some other encryption/encoding techniques, where a unintelligible digest is provided (e.g., following an MD5 hash algorithm), etc.

However, providing encoding that creates an intelligible ciphertext is not a trivial process. Codebooks and/or keys must be carefully selected and processed such that there is sufficient strength in the encoding to suit various purposes. However, the need for intelligibility may limit the available choices of encoding techniques and sources. As indicated in some embodiments, various codebooks may be utilized in conjunction with various keys, and the codebooks themselves may be extended through the use of similar looking (to humans) but different characters (e.g., characters having accents, strikethroughs), etc. Such extension may be useful as the extension of the universe of available words for use in a codebook becomes much larger with the added permutations and combinations of characters and their similar-looking but different characters (e.g., rather than having a single alphabetical letter in a position in the codebook, there are different combinations for each character set using a set of potential similar-looking but different characters for each character in the codebook.

Computing systems, such as processors, memory, and non-transitory computer readable media may be utilized advantageously to process and/or determine how a particular element of information should be encoded using a codebook and/or a key. The encoding/decoding may take place, for example, using an encoder/decoder module or unit, among others. In some embodiments, the encoder/decoder module or unit is a physical circuit adapted for applying one or more encoding and/or decoding techniques to provided information (or ciphertext).

In some embodiments, codebooks and/or keys may be purchased by one or more users, and/or associated with one or more groups of users. For example, the codebooks and/or keys may be meant for sharing such that individuals selling the codebooks and/or keys effectively use such a system for access control as it relates to electronic information and/or materials.

Encoded messages may include various elements of metadata, which may, for example, describe the requisite codebook, key, scrambling factor required, etc. Encoded messages may also include various advertising messages, uniform resource locators (URLs), hash tags, and/or other additional elements.

The encoding and/or decoding of messages may be configured to be available on a time limited basis. Decoding tools may be configured to be phased out after a period of time, and similarly, encoding tools may also be configured to be phased out after a period of time. For example, messages may be encoded using a particular encoding scheme that expires, and after the encoding scheme is expired, users may not be able to decode the message. A potential benefit to such an implementation is the ability to control the persistence of messages, as the loss of a key or decoding tool may render ciphertext undecipherable. In some embodiments, the system may be configured to edit an existing message and to replace the existing message with a new set of ciphertext, so that the message is now decodable using another set of decoding tools (e.g., to transition a message to belong to another conversation or to be available to another group). In some embodiments, the editing of messages on media platforms may be conducted automatically by the system.

In some embodiments, various encoding and/or decoding tools may be configured to be utilized and/or applied based on various logical conditions and/or rules. For example, there may be a key associated with during work, after work, at a party, blackout periods, location sensitivity, delayed delivery, multiple key interoperability, time sensitive offers, etc., and these particular keys may have one or more rules associated with them, etc., a planned obsolescence of the key, etc.

Encoding may, in some embodiments, include various stages and/or steps in various permutations, such as an initial encryption of a message to develop a preliminary set of ciphertext, which is then mapped to phrases having characters that may appear to be similar to standard English characters and other alphabets or languages as applicable, but instead may be comprised of characters from an expanded character set, such as UTF-8.

There may be various behavioral/psychological aspects of using human-readable ciphertext, such as the ability to transmit and/or broadcast messages that are not disruptive relative to other messages being transmitted and/or broadcasted, the ability to select ciphertext based on familiar and/or relevant source material (e.g., selecting a phrase about birds in a conversation generally about birds), etc. The involvement of a user may increase the adoption of the system and/or the overall user experience.

There may be psychological aspects related to the general public, who may not be able to decipher the encoded messages. For example, a member of the general public may notice that there is a conversation taking place on a public communication medium, and the person's interest may be piqued in view of the exclusivity of the conversation.

Advertisements may be elegantly and conveniently included as part of the ciphertext of encoded messages, and may be selected to be relevant based on the subject matter of the conversation. Additional information related to advertisements and/or advertising parties may include, for example, the incorporation of corporate hash tags, messaging, analytics (e.g., tracking distribution of keys), etc.

These advertisements, for example, may be introduced by the encoder/decoder module during various stages of encoding/decoding. For example, advertisements may be utilized as an essential part of the codebook, such that all messages encoded using a particular codebook result in the display of a message within the ciphertext. Conversely, a system may receive what seemingly looks, to a human, like an advertisement, and the system may determine that "advertisement" is actually ciphertext and may be decoded using one or more of a corresponding codebook and a key.

In some embodiments, messages may be encoded and the ciphertext may resemble real messages that may be sent, for example, in the context of the general topic of the conversation, etc. In some embodiments, the system may be adapted to determine a general topic of conversation through keyword mining (e.g., most used word, most used phrases, most used types of words), and based on the determined general topic of conversation, access the database of codebooks and computationally select a codebook that most closely matches the determined general topic of conversation.

For example, a chef may be discussing the decor of her restaurant on a social media platform that is publicly accessible, and the chef may wish to transmit an encoded message to another set of chefs using the social media platform. However, the chef and the other set of chefs may have no other practically available (or convenient) means of communication. The chef may access the system and, through a programmatic interface, select an input which triggers the encoding of messages attributed to the chef. The system may then be configured to automatically mine the most recent conversations (e.g., conducting an electronic textual analysis of recent words and messages) and estimate that the topic was restaurant decor. The system may then utilize the estimation of the topic in conducting a search of similarly themed codebooks. In some embodiments, codebooks may be sorted by topic and key word. In other embodiments, a similar codebook may be chosen through an automated analysis of a representative portion of some or all of the codebooks.

In this example, the chef may present a message that seemingly is related to the decor of her restaurant, but actually is an encoded message being sent to others. The chef, may, through an interface, sell access to the chef's real message (e.g., by providing others with the codebook and/or key).

Some potential advantages to the systems and methods described in some embodiments may include the following:
 the ability to communicate securely across various platforms that may be configured for otherwise insecure communications, such as media platforms, social networking sites, email, websites, forums, etc. (e.g., so that communications cannot be intercepted by a maliciously configured router, browser, application);
 the ability to communicate securely across various communication media that may be configured for otherwise insecure communications (e.g., the ability to secure any communication 'pipe', and the ability to integrate directly into communication media);
 the ability to tailor ciphertext based on the particular characteristics of a media platform (e.g., character limits, available character sets);
 the ability to create private communications without requiring users to change the way in which they post content;
 the ability to utilize ciphertext that may resemble conversational phrases that may be in line with the context or the topic of a conversation;
 the ability to add a layer of security to otherwise secure communications, potentially strengthening the security of communications;
 the ability to interoperate with existing infrastructure and/or existing media platforms;
 the ability to send encoded messages that appear to be readable messages to humans; the ability to control persistence of messages through the controlled distribution of decoding tools (e.g., keys, codebooks);
 the ability to limit persistence of messages through limiting and/or eliminating stored encoding/decoding tools (e.g., a message may be encoded and provided;
 the ability to select ciphertext resulting from encoding, in particular, from codebooks having messages desirable by the user (e.g., a quote from The Picture of Dorian Gray, by Oscar Wilde);

the ability to incorporate advertising and/or sponsor messages into the messages;

the ability to control/track the distribution of decoding tools and/or the sharing of a message (e.g., within one or more defined groups, within a trusted network, a paid network);

the ability to distribute encoding/decoding tools to various groups, such as distribution lists, etc.;

the ability to utilize user-generated codebooks as source libraries for ciphertext;

the ability to utilize contextual and/or context related codebooks as source libraries for ciphertext;

the ability to secure enterprise communications (e.g., as a layer for enterprise communications);

the ability to secure communications on mobile devices (e.g., to secure a channel at the application level);

the ability to apply multiple layers of encoding, such as hierarchical encoding;

the ability to operate on third party systems and/or communication links;

an increased ease of use relative to other encryption schemes;

the ability to incorporate workflow and/or business logic; and the ability to secure communications prior to an operating system engaging in an encoding or encrypting process;

the convenience and ease of implementation as a 'one step action' that may be platform independent;

the ability to monetize/reward communication streams through controlling the distribution of keys; and/or the ability to cooperate with transmission pathways so that the encoded text appears as a friendly package instead of spam. (e.g., Messages can get through during mitigation of a DDOS attack)

The systems and methods may also be utilized to add an additional level of security on top of those utilized by secure communication mediums. For example, the systems and methods may be configured to integrate with enterprise communication systems, such as message buses, instant messaging platforms, email platforms, etc., and may also be configured to integrate with various distribution and/or contact/grouping systems, such as lightweight directory access protocol (LDAP) systems, active directory (AD) services, etc. Directory services may be used for group management and/or retrieval of user profiles. The grouping of individuals may be used for the automatic encoding/decoding of messages, the distribution of decoding tools, etc.

In some embodiments, the systems and methods may be incorporated into devices, as hardware (e.g., a purpose built field programmable gate array (FPGA)), software (e.g., an application stored on device memory), or a combination. The systems and methods may also be incorporated into communication infrastructure (e.g., infrastructure for sending SMSs).

In some embodiments, the systems and methods may be integrated into a communication medium. In some embodiments, the systems and methods may be provided through a web interface. In some embodiments, the systems and methods may be provided through distributed networking resources, such as a cloud computing implementation. In some embodiments, the systems and methods may be utilized to provide a news release service.

FIG. 1 shows an example of a system 100, according to some embodiments. System 100 may be configured to provide for communications between one or more content creators to one or more content consumers, and/or the general public. The system 100 may include administrative capabilities by administrators.

System 100 may be comprised of a user interface subsystem 102, an administrative interface subsystem 104, a key generation subsystem 106, a construction/deconstruction subsystem 108, a notification engine 110, a media platform integration subsystem 112, a key/codebook management subsystem 114, a user profile management subsystem 116, an advertising network subsystem 118 and a database 120.

The subsystems and/or components of system 100 are provided merely as examples. There may be other subsystems and/or components, and/or subsystems and components may be combined as singular components. System 100 may be implemented using various technologies, such as computing systems having processors, non-transitory computer-readable media and instructions, which when executed, provide various computer-implemented methods for encoding and decoding messages.

The user interface subsystem 102 is configured to receive in the form of electronic signals, an unencoded message having one or more unencoded characters formatted based on a standard character set having standard characters. The user interface subsystem 102 may, in some embodiments, be integral to a social media network, a communication platform, a communication link, etc. In some embodiments, the user interface subsystem 102 is provides an input box or an input field upon which a user may provide the unencoded message. In some embodiments, the user interface subsystem 102 receives a message from another unit (e.g., the user interface subsystem 102 is used through an application programming interface).

The user interface subsystem 102 then processes the unencoded message to extract one or more unencoded message phrase attributes; including, for example, phrase length, word sizes, character occurrence rates, and/or other phrase attributes. These phrase attributes, for example, may be utilized later to select a suitable codebook phrase based on a set of available codebook phrases (e.g., to determine the most suitable codebook phrase).

An administrative interface subsystem 104 is configured to provide administrator users the ability to modify various aspects and/or parameters associated with how the system 100 operates, such as the use of keys, selection of codebooks, provisioning of readability factors, etc. Such parameters may, for example, impact the performance, efficiency, and/or speed of encoding performed by system 100. These aspects may need to be balanced in relation to providing an unobtrusive experience for a user (e.g., encoding may need to be sufficiency fast on limited processing power, and as a result, various trade-offs may need to be made in relation to robustness of encoding, etc.).

The key/codebook management subsystem 114 is configured to manage various codebooks stored in the database 120, each codebook containing a plurality of phrases that may be potentially used for encoding. Based on the unencoded message received at the user interface 102, the key/codebook management subsystem 114 is configured to identify one or more phrases indexed from the one or more codebooks stored on the database 120 based on at least on matching a length of the unencoded message to a length of the one or more human-readable phrases. The key/codebook management subsystem 114 is then configured to process the identified one or more phrases to extract one or more sets of phrase attributes, each set of the one or more sets of phrase attributes corresponding to one of the one or more phrases. The key/codebook management subsystem 114 then selects one of the one or more phrases by conducting an automatic comparison of the one or more unencoded message phrase attributes to the sets of phrase attributes.

In some embodiments, a key generation subsystem 106 is utilized to generate a key that is utilized to further scramble the codebooks stored in the database 120. The construction/deconstruction subsystem 108 is configured to construct/deconstruct messages (e.g., encode/decode) messages using at least the received message for encoding, and then selected phrase. The construction/deconstruction subsystem 108 encodes messages by mapping extended characters from one or more extended character sets to the standard characters, the mapping establishing linkages between standard characters and extended characters from the extended characters that are visually similar to one another.

In an embodiment, the mapping of extended characters from one or more extended character sets to the standard characters includes associating with the linkage a readability factor indicative of how visually similar an extended character is relative to the standard character upon which the extended character is mapped to. The readability factor is important when determining how ultimately readable the output encoded message is. As compared to other encoding techniques where the ciphertext is effectively gibberish, a further technical problem that arises is the need for interpretable ciphertext.

The replacement of standard characters that are easily readable and interpretable by a human with extended characters may cause a decrease in the readability of an encoded output, as the extended characters may contain various other flourishes and markings, such as umlauts, accents, strikethroughs, rotations, etc. Accordingly, there may be decreased readability in association with the extended characters.

In an embodiment, a readability factor is assigned and/or otherwise associated with a mapping of a standard character with its visually similar variations in extended character sets. The readability factor may be automatically assessed and, in some embodiments, stored in advance on database 120 for known mappings based, for example, on the amount of determined visual difference between a standard character and its visually similar extended character. For example, there may be a different readability factor assigned between an 'e with an umlaut' and a standard 'e', and an 'e' having an accent grave. The readability factor may further decrease with an increasing of visual dissimilarity, for example, where a standard English character is replaced with a Cyrillic character that has some similarities to but does not entirely visually resemble the standard English character.

The construction/deconstruction subsystem 108 establishes a mapping table between each of the one or more unencoded characters and a corresponding extended character that is mapped to the standard characters that compose the selected phrase. The mapping table is mapped based on a key; the construction/deconstruction subsystem 108 encodes the message by progressively replace the characters of the selected phrase using the mapping table to replace the characters with corresponding extended characters, such that following replacement of all the characters of the selected phrase, a visually similar output phrase is provided that is composed of mapped extended characters.

In an embodiment, the mapping table is established based at least on a minimum threshold readability factor between mapped unencoded characters and corresponding extended characters. This minimum threshold readability factor may aid in ensuring that the output encoded message contains ciphertext that has a minimum level of readability. For example, the ciphertext may suboptimal if, through the process of replacement, the standard characters of the ciphertext has been replaced with poorly chosen extended characters such that the ciphertext is no longer readable by a human without the human expending a large amount of effort to interpret the extended characters.

In an embodiment, the selected phrase is preprocessed to replace repeating characters of the selected phrase with extended characters such that following pre-processing, the selected phrase contains no repeating characters. A technical advantage to such an approach may include an increasing in the robustness of the encoding, and less vulnerability to automated and/or brute-force type approaches in breaking the encoding by a malicious third party using an automated code-breaker program.

The notification engine 110 is configured to provide various notifications based on triggered events, such as when a user's affiliated codebook is purchased, a user receives a message, etc. The media platform integration subsystem 112 is configured to integrate system 100 in relation to various media platforms, and includes various application programming interfaces that are adapted for the transfer and communication of messages and information. The user profile management subsystem 116 tracks and maintains a user profile, which, for example, may include associated (e.g., purchased) codebooks that may then be marked as available for use by the user in user interface 102, etc.

The advertising network subsystem 118 is configured to provide and/or identify codebooks that include advertising messages, and/or track the usage of such codebooks to assess the success and/or uptake of a particular advertising campaign. For example, the system 100 may be adapted to provide for users who have not otherwise purchased codebooks, free codebooks that consist of advertiser messages. When the user encodes a message, the codebooks include phrases having advertiser messages, which are then adapted into extended character sets during encoding/transformation and used as ciphertext. When the ciphertext is transmitted on social networks, they will appear as visually similar to the advertiser messages in the codebooks.

Figure 2:
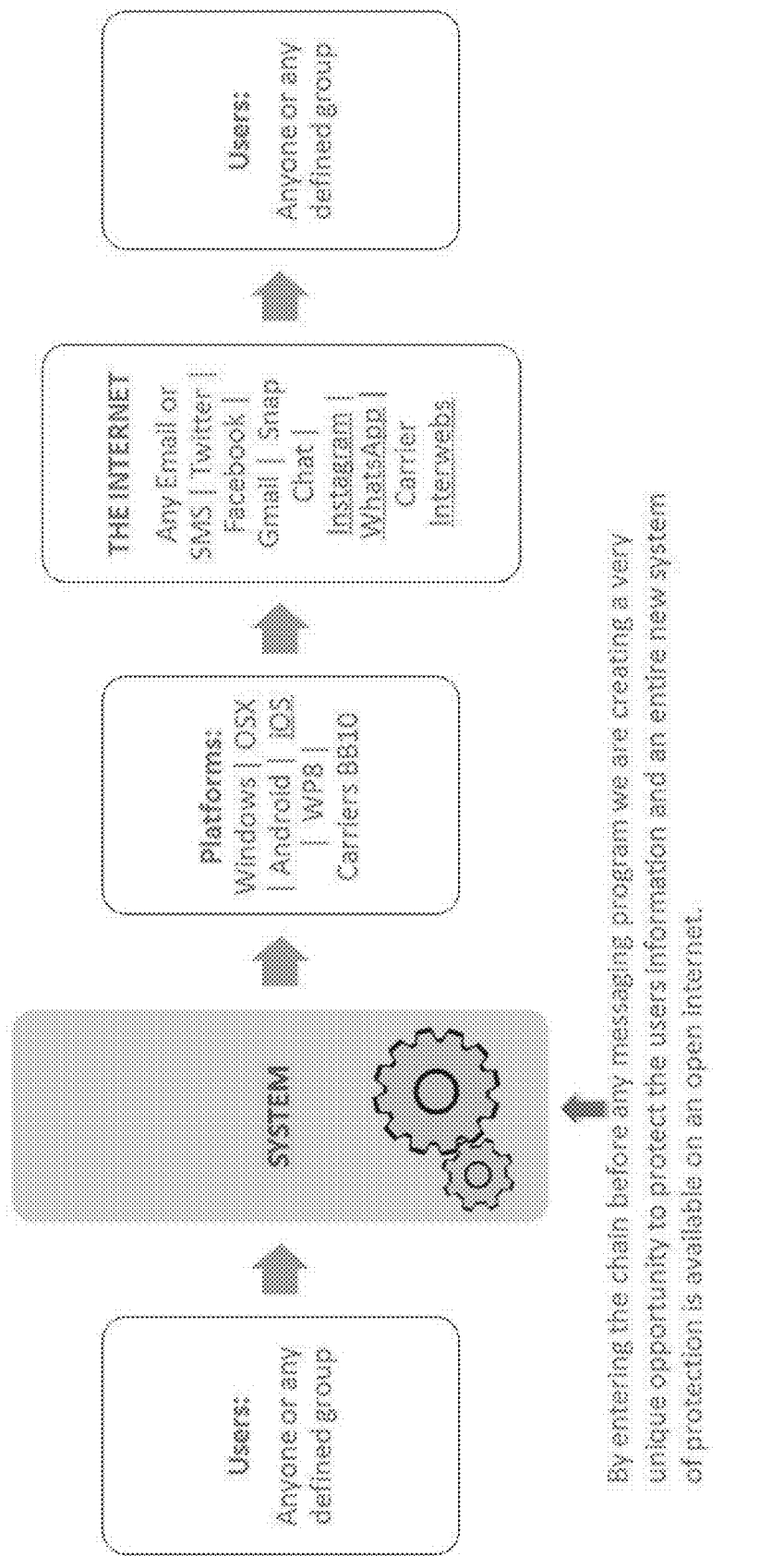
FIG. 2 is a schematic diagram that illustrates a sample implementation of the system, where the system is implemented to encode messages before the messages enter any messaging system, according to some embodiments.

FIG. 2 is a schematic diagram that illustrates a sample implementation of the system, where the system is implemented to encode messages before the messages enter any messaging system, according to some embodiments.

System 100 may be configured to interoperate with various external systems, such as media platforms 140, communication media 142, external websites 144, and/or campaign management systems 146.

Media platforms 140 may include, for example, Twitter™, Facebook™' Snapchat™, WeChat™, Kakaotalk™, Pinterest™, Foursquare™, MySpace™, Google+™ LinkedIn™, YouTube™, etc., or any suitable platforms where individuals may share information, post messages, send messages, etc. The system 100 may, for example, be used in the transmission of messages on these platforms that are publicly available. Using the system 100, a user may post an encoded message on to the media platform, which, in some embodiments, may be a user-readable message related to a particular output phrase, but may actually contain an underlying message that may be decipherable by individuals having the correct keys, codebooks and/or scrambling factors.

Figure 3:
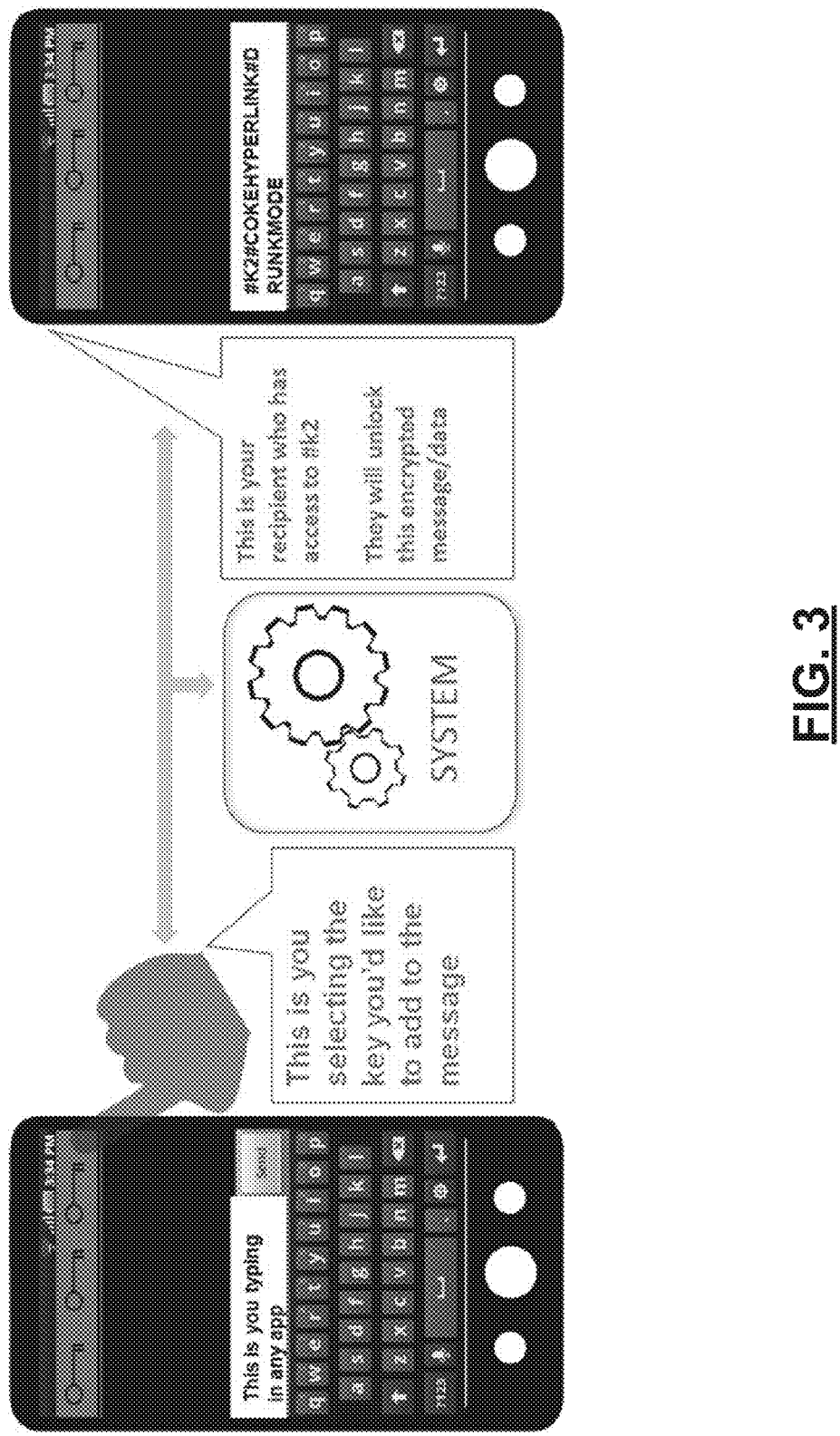
FIG. 3 is a sample diagram illustrating two that may be communicating through a channel secured by system 100 using various encoding and decoding schemes, according to some embodiments.

FIG. 3 is a sample diagram illustrating two that may be communicating through a channel secured by system 100 using various encoding and decoding schemes, according to some embodiments.

For example, a celebrity may appear to be posting a message containing a quote from Hamlet using extended UTF-8 characters, but the message is actually an encoded message wherein the underlying message is an invitation to a private show, decipherable by fans of the celebrity who have access to the key and/or codebook used to encode the message.

Communication media 142 may include, for example, mediums such as email, short messaging services messages (SMSs), BlackBerry Messenger™ (BBM/PIN) messages, iMessages™, WhatsApp Messages™, etc. In some embodiments, messages across various suitable media channels may be encoded, for example, providing an additional level of security for these often unsecured channels.

In some embodiments, communication media 142 may include enterprise communication systems, such as internal messaging systems, financial transaction systems (e.g., sending encoded receipts, transaction information); mobile notifications (e.g., a message pops up on a device, but the recipient wishes to encode the notification itself in the context where third parties may be able to view the device screen); etc.

In some embodiments, system 100 may include various interfaces such that functionality may be packaged as or with a software development kit (SDK), in which features may be exposed through the use of software development tools.

The system 100 may be used, for example, to secure corporate communications and/or various communications of a sensitive nature, such as messages related to transactions, business-sensitive information, etc.

The system 100 may be used in conjunction with other messaging systems, platforms and/or devices for the selective encoding of messages, for example, if a user wishes to encode notifications for messages being received by the user's tablet, but not encode notifications for the same messages being received by the user's smartphone or any connected device.

Device identifiers, etc., may be used to track devices and/or apply selective encoding/decoding functionality to received messages, through the user interface subsystem 102.

Similarly, the device identifiers may also be used to selectively encode messages being sent by a user at a particular device, etc.

The system 100 may be implemented on devices as endpoints (e.g., being embedded as an application, as part of the operating system, as a keyboard), or may be implemented as part of a communication medium (e.g., encoding messages being sent through the medium) and/or intermediary communications devices (e.g., as part of an enterprise messaging system).

Figure 4:
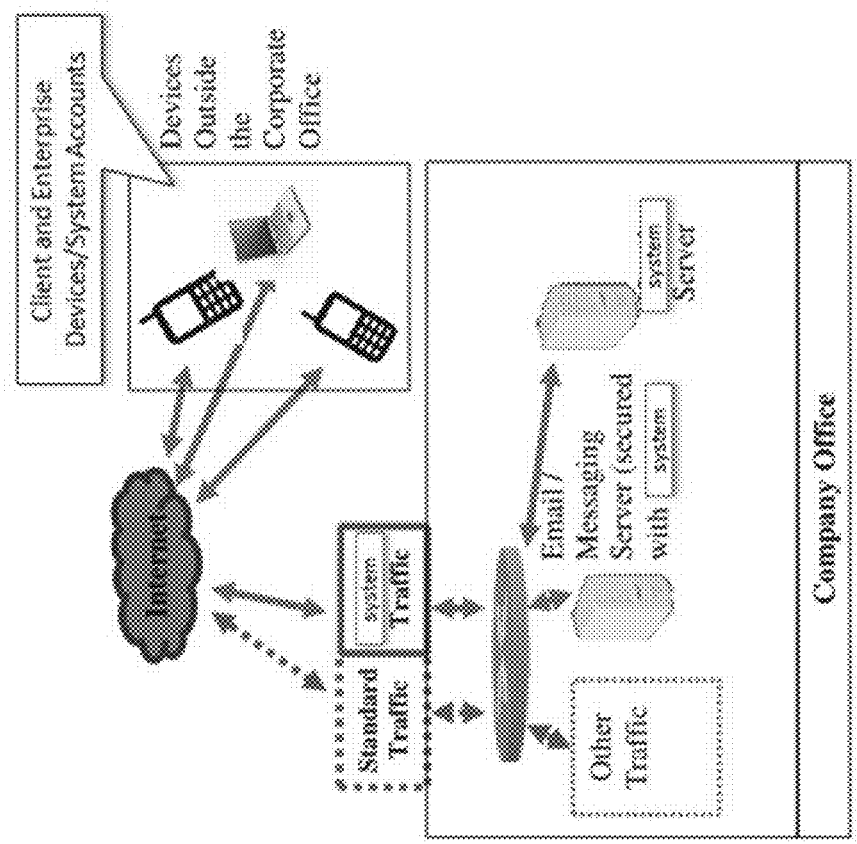
FIG. 4 is a sample schematic diagram illustrating the system (Navajo) being used to secure corporate traffic, according to some embodiments.

FIG. 4 is a sample schematic diagram illustrating the system being used to secure corporate traffic, according to some embodiments. There may be various devices inside and outside virtual networking security perimeters, such as a firewall and/or secured group policy administration. The system 100 may be configured to provide secured communications despite the presence of devices outside of the virtual security perimeter.

Figure 5:
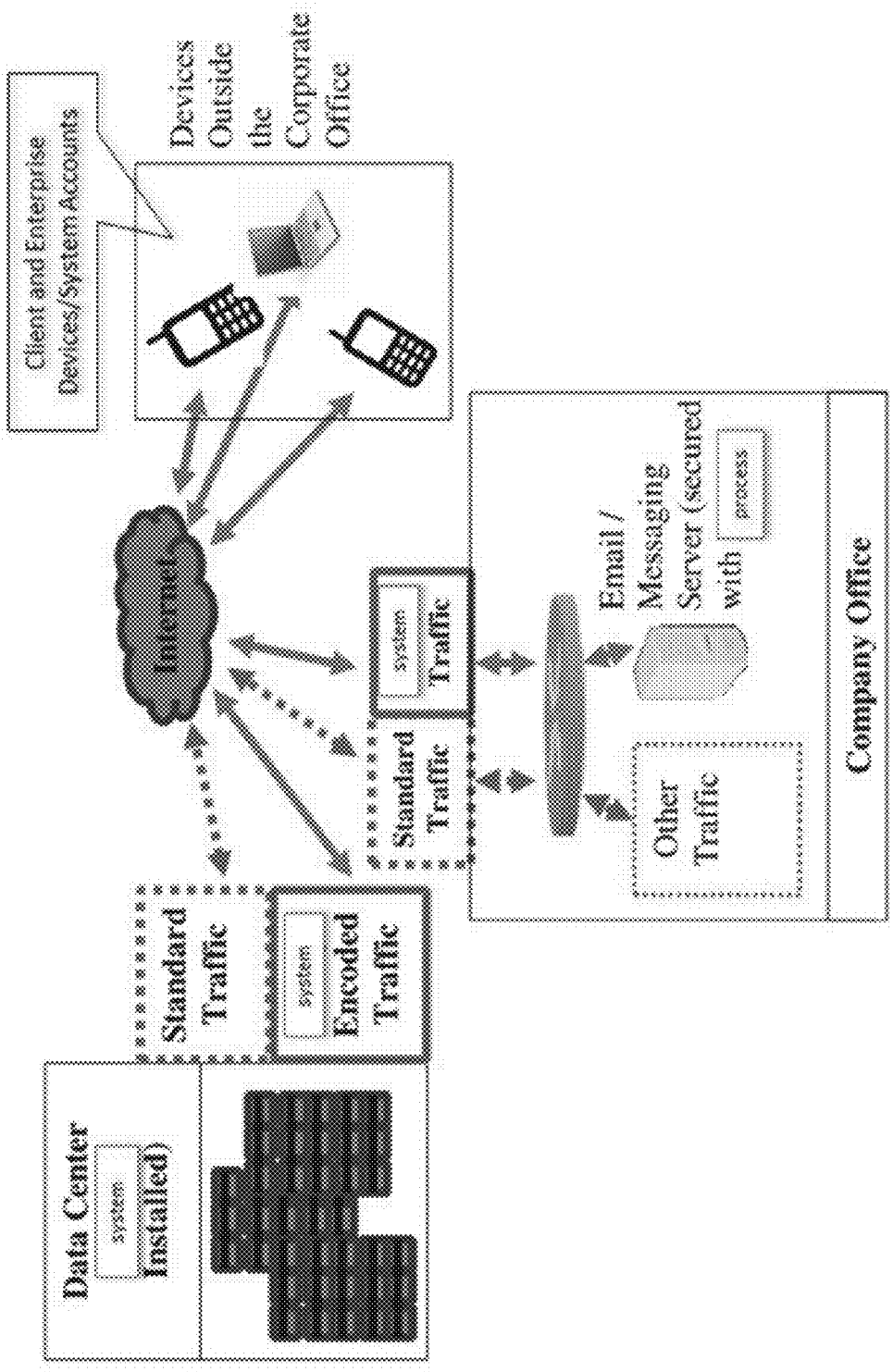
FIG. 5 is a sample schematic diagram illustrating the system (Navajo) being used to secure corporate traffic along with a secured data center, according to some embodiments.

FIG. 5 is a sample schematic diagram illustrating the system being used to secure corporate traffic along with a secured data center, according to some embodiments. Similarly, the system 100 may be configured to provide secured communications despite the presence of devices outside of the virtual security perimeter. Further, there may be additional layers of security that may be implemented using system 100, for example to secure communications between a data center and/or other types of communications. System 100 may also be used to selectively encode information, and/or to provide hierarchical levels of encoding (e.g., stronger encryption used for a select portion of messages).

External websites 144 may include various websites that may transmit messages and/or post messages, such as Internet forums, imageboards, comments, hypertext mark-up language websites (HTML), etc.

Campaign management systems 146 may include various systems for managing one or more advertising and/or customer relationship managing campaigns. For example, a brand or a celebrity may utilize various tools to track fan engagement, etc. In some embodiments, system 100 may be configured to interoperate with these campaign management systems 146 to, for example, keep track of the dissemination of keys associated with a celebrity, etc. In some embodiments, the campaign management systems 146 may be utilized for the monetization of various activities associated with system 100.

The user interface subsystem 102 may be configured to provide an interface for one or more content creators to access various capabilities of the system 100, such as encryption, obfuscation, key/codebook distribution, etc. For example, the user interface subsystem 102 may provide an interface through a website, a mobile enabled site, a mobile application, etc. In some embodiments, the user interface subsystem 102 may be accessed through one or more application programmable interfaces (APIs), for example, using SOAP, RESTful techniques, exposed application functions, etc. Content consumers may also utilize user interface subsystem 102 to receive keys, purchase keys, download codebooks, decode/decrypt messages, etc.

The user interface subsystem 102 may provide one or more interfaces in which plaintext messages may be entered and/or otherwise provided, and ciphertext may be provided as an output. In some embodiments, the ciphertext may be one or more human readable sentences output based on one or more keys and/or codebooks that have been applied by the system 100.

Conversely, there may be one or more interfaces where ciphertext messages may be entered and/or otherwise provided, and the underlying plain text may be displayed as an output, if a user has access to a corresponding decoding tools, such as a key and/or codebook.

In some embodiments, the user interface subsystem 102 may be directly integrated on to a user's device capabilities, for example, as a virtual overlay on a user's keyboard and/or message display screens, as a selectable choice when sending/receiving messages, etc. For example, a user's device may be configured to identify an encoded message upon encountering an encoded message and apply one or more decoding capabilities and/or interfaces automatically, etc.

In some embodiments, the user interface subsystem 102 may be configured to provide various options and/or decision support to a user when the user is seeking to encode a message. For example, various options for output ciphertext may be provided, various options for codebooks may be provided, various options for advertisements (e.g., messages, placements, hashtags, metadata) may be provided. These options, in some embodiments, may be determined by the user interface subsystem 102 based on various factors, such as the preferences stored in the user's profile, popular phrases and/or codebooks, the readability of the output ciphertext (a readability maximization factor), etc.

The user interface subsystem 102 may also be configured to permit a user to select various monetization options, such as the implementation and/or use of tracked decoding tools, etc.

In some embodiments, the user interface subsystem 102 may be configured to segregate recipients into various predetermined groups and automatically apply one or more encoding tools on messages based on the membership of the recipients in the predetermined groups.

In some embodiments, the user interface subsystem 102 may be directly integrated into the input/output capabilities of one or more external websites 144 and/or media platforms 140. For example, the external website and/or media platforms 140 may utilize one or more capabilities of the system 100 in effecting various types of communication.

As an example, a content creator may post to an arbitrary media platform using the system 100, and the post may include a link (e.g., a generated unique URL) that may be associated with that post. This post and link, for example can be seen and interacted with by anyone on that social network, such as members of the general public. However, interaction with and/or message decoding may require the use of the system 100, and may require, for example, a registered user account, a specific conversation identifier, and/or authorization from the content creator.

In some embodiments, the user interface subsystem 102 may also be configured to record various information about a user's visit and/or use of various interfaces, such as taking timestamps, recording internet protocol (IP) addresses, other tracking information (e.g., tracking cookies). This information may be used to identify and/or determine the time of visit of a particular user.

In some embodiments, the user interface subsystem 102 may identify new users, and based on various calculated information, such as the time between visiting a landing page and new user registration, may provide suggestions regarding potentially relevant specific conversations. For example, a time period for providing suggestions may be based on and through the following factors:

Regional location;
Carrier and associated carrier download speeds;
Mobile platform and OS version; and
Device specific application install capabilities; among others.

Further, information such as a first-run time may, for example, be used to calculate a relevance/correlation factor of specific conversations to the registration of new users.

The administrative interface subsystem 104 may be configured to provide one or more capabilities to administrators to manage and/or otherwise adapt the operation of the system 100. For example, there may be various action logging, analytics, key/codebook rule definition, etc., capabilities that an administrator may utilize. An administrator may be able to control the distribution of a key (e.g., set distribution groups/lists), identify source libraries for codebooks, select codebooks, etc.

The key generation subsystem 106 may be configured to generate one or more keys, such as public/private key combinations, private keys, etc. In some embodiments, combinations of keys may also be utilized. In some embodiments, the keys generated may include the use of one or more encoding techniques to aid in the protection of the integrity and authenticity of the underlying message, such as the inclusion of parity check codes, signatures, authentication codes, etc.

There may be various types of keys provided, such as free keys (where advertisements may be provided into a content creator's messages), a sponsored key (where a brand and/or sponsor may be able to label, design and/or launch a community), a publicly curated key (where users, such as members of the general public or fans, are able to buy into a community through the purchasing of keys and/or codebooks to access group information), a corporate key (where company accounts with subgroups can be made), and a password generator (which may turn shorter passwords into stronger passwords through the use of encoding).

The key generation subsystem 106 may also be configured for the hashing of message data, potentially generating one or more hash values, hash codes, hash sums, etc., using one or more hash functions. Message data may be hashed, for example, to map plaintext to one or more extended character sets, such as UTF-8.

In some embodiments, message data is hashed such that plaintext having a particular character and/or sentence structure may be hashed to corresponding ciphertext that may be configured to be human readable text but may actually be comprised of unique machine readable codes. For example, there are a number of additional characters provided in UTF-8 beyond ASCII characters that, while being similar in appearance to a human, correspond to different underlying UTF-8 characters.

Accordingly, while the ciphertext may appear to be readable to a human (e.g., corresponding to a particular lyric, quote, idiom), the ciphertext may actually be difficult for a machine to derive and/or interpret information from.

In this example, a potential advantage to using extended character sets having characters that look similar to other ASCII text may be the ability to represent a particular lyric/quote/sentence using various combinations and/or permutations of characters, expanding the potential opportunities and/or usages of a particular phrase to be used as ciphertext (e.g., there may be different representations that may 'look' similar to an A in UTF-8, which may then permit a wider range of potential codes to be encrypted using a particular phrase or sentence). Such an embodiment may be potentially advantageous in the context of media platforms, where an individual may desire to post a hidden message without the need to post gibberish ciphertext.

In some embodiments, encryption utilizes one or more codebooks. The codebooks may be provided such that there are various text outputs that users can choose from (e.g., codebooks may be taken from various quotes, song lyrics, books). These codebooks may need to be the same for each counterparty user (e.g., a content creator and a trusted content consumer) in order to decode the messages. Using the same codebook, for example, a secure communication channel may be set up between any two trusted users.

Codebooks may be generated by the key generation subsystem 106, and may be configured to be index-able by various end-user interfaces, such as those provided by the user interface subsystem 102. For example, a communications channel may be include the use of a scrambling factor associated with a codebook that may systematically alter the codebook to uniquely protect each set of communications. In some embodiments, the scrambling factor may also be necessary to decode/decrypt the message.

The construction/deconstruction subsystem 108 may be configured to construct encoded messages from provided plaintext messages through the conversion of plaintext into ciphertext, and to deconstruct decoded messages to plaintext through the conversion of ciphertext into plaintext. The construction/deconstruction subsystem 108 may be configured to receive various encryption keys (e.g., public keys, private keys, symmetric keys), codebooks and/or hashing functions for application in constructing or deconstructing messages.

In some embodiments, a content creator may be able to select which potential output phrase and/or encryption method to utilize, through the user interface subsystem 102. In some embodiments, the selection of potential output phrase and/or encryption method may be configured by an administrator through the administrative interface subsystem 104.

For example, given a standard English sentence as input, the construction/deconstruction subsystem 108 may be configured to accept a standard English sentence as a user input (e.g., as ASCII text). A standard English sentence may, for example, be defined as: basic alphanumerics (a-z A-Z 0-9) and common punctuation (, . ? ! ' " etc.).

As an example, the phrase "that is a hot girl" includes 3 "t"s, 2 "a"s, 2 "h"s, 2 "l"s, and that needs to change in order to allow unique mapping between input and output. This example sentence can be represented in hexadecimal form 74 68 61 74 20 69 73 20 61 20 68 6f 74 20 67 69 72 6c. Notably, there may be the repeating numbers, ignoring the 20 which is a space.

The construction/deconstruction subsystem 108 may be configured to replace all repetitions of basic alphanumerics with characters that, to humans, may looks similar to the English letter but may be different from a hexadecimal value representation. The construction/deconstruction subsystem 108 may be configured to modify standard sentences (e.g., those encoded in ASCII) received from a content creator or other input into a string of unique and non-repeating characters using an extended character set, such as those from the UTF-8 encoding scheme.

Figure 6:
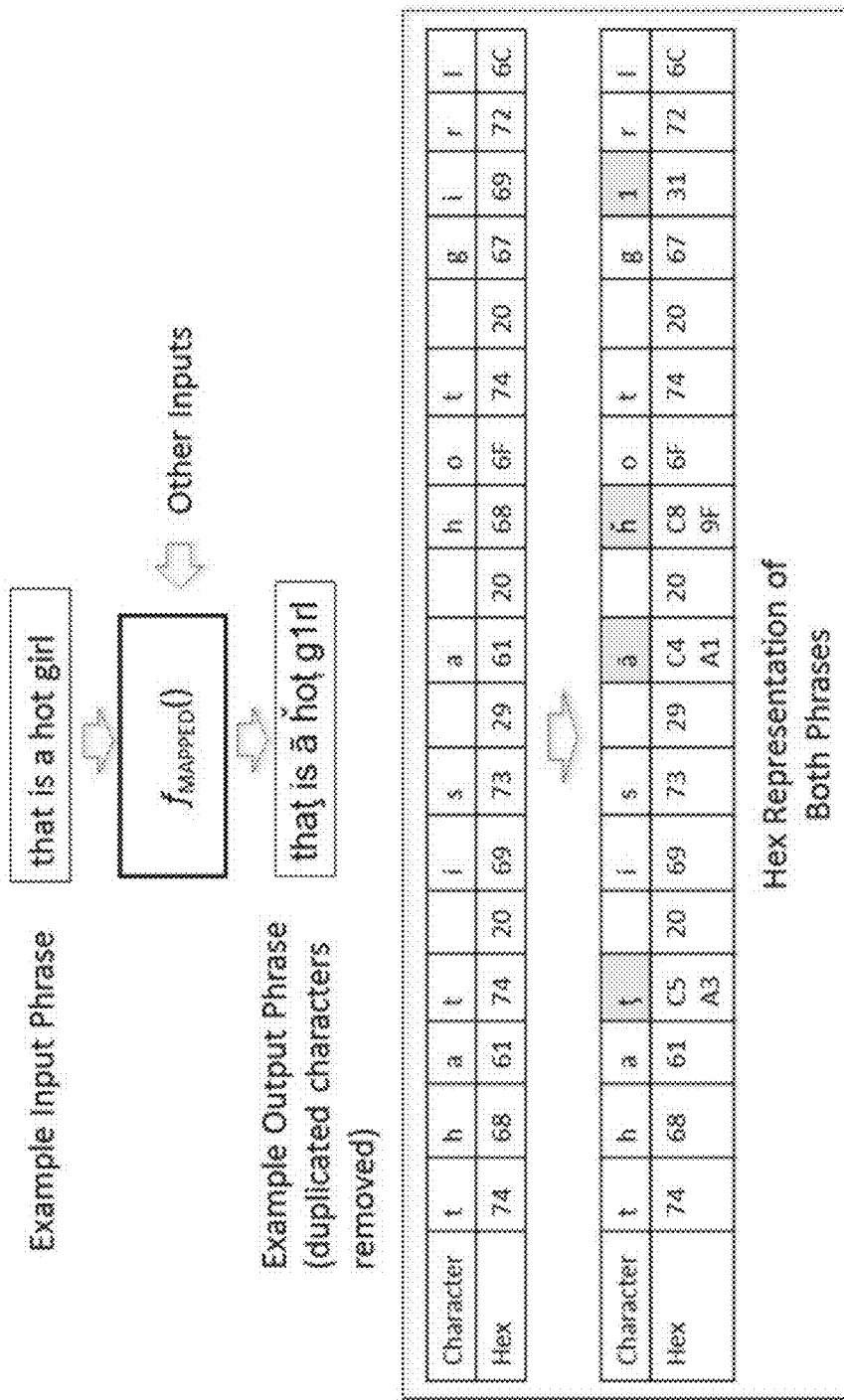
FIG. 6 provides a sample replacement string of hexadecimal characters for the phrase "that is a hot girl", according to some embodiments.

FIG. 6 provides a sample replacement string of hexadecimal characters for the phrase "that is a hot girl", according to some embodiments. The top string is a replacement string, and the bottom string is the original string. Notably, the bottom string has multiples, and in the top string, the multiples no longer appear.

For example, "that is a hot girl" may be mapped to: "tha ṭ is ā hoṭ g1rl". Represented in hexadecimal, the characters may read: 74 68 61 c5 a3 20 69 73 20 c4 81 20 c8 9f 6f c8 9b 20 67 31 72 6c. While some characters may appear to be repeating to the human eye (e.g., ṭ and t), from the perspective of a machine, there may actually be different characters from the extended character set in use. The use of such characters from expanded character sets increases the number of potential variations of phrases that may be used in the application of various encryption and/or encoding schemes. Accordingly, there may be many different permutations and combinations for representing a particular phrase from a book or a song using extended character sets, which may be advantageous in providing a larger set of options to users in terms of human-readable ciphertext.

A potential challenge with utilizing simple mapping between standard characters and extended characters may be weaknesses to external decipher techniques utilizing, for example, frequency analysis, brute force techniques, etc. Where sensitive messages are being encoded and sent, it may be important to utilize schemes that may impart a higher level of security to communications and/or messages.

In some embodiments, the construction/deconstruction subsystem 108 may be configured for algorithmically replacing standard characters (e.g., English/ASCII) with extended characters (e.g., UTF-8 characters) which, to the end user, are read as the same English character. This modification may allow the user to mask the user output preventing it from being machine readable. In some embodiments, the replacement functionality may be used to obfuscate messages such that the ability for machines to read and/or interpret communications is limited. There may be increased privacy in a message, as it may not be readily searchable and/or indexed by a search engine.

As an example: English: I love my smartphone, UTF-8 Equivalent: Ĭ ĺŏv̆εmy̆sʍǎrtp̌h̆ȯn̆ȇ Example 2: English: We depart at 5:00 am, UTF-8 Equivalent: Шεp̌ep̌ą̆ŕTą̆ᴛ 5:oθ̇ȧM Example 3: English: My Mother Made Many Muffins, UTF-8 Equivalent: MYm̩OT Ĥ ÉR̂mă d̨ εᾱ ā̇nY MüFfíŋş.

The number of extended characters that may map on to each ASCII character provides flexibility and choices in determining the mapping of the characters, including various potential permutations and/or combinations of extended characters. For example, an 'O' may be represented using a number of different characters from extended character sets.

Figure 7:
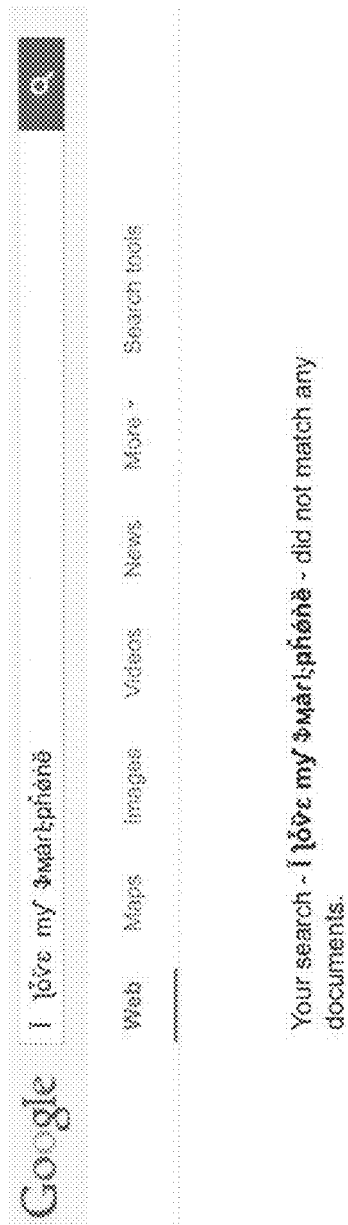
FIG. 7 is a sample screenshot that provides search results related to an encoded message that uses UTF-8 characters to depict a phrase, according to some embodiments.

FIG. 7 is a sample screenshot that provides search results related to an encoded message that uses UTF-8 characters to depict a phrase, according to some embodiments.

Figure 8:
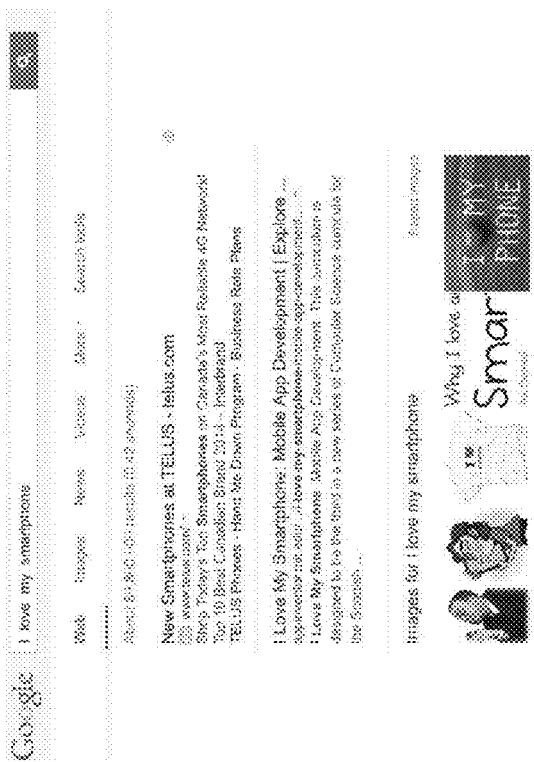
FIG. 8 is a sample screenshot that provides search results related to an unencoded message, according to some embodiments.

FIG. 8 is a sample screenshot that provides search results related to an unencoded message, according to some embodiments.

FIG. 9 is a sample table illustrating UTF-8 character options that may be used for encoding the phrase "I love you", according to some embodiments.

In some embodiments, various obfuscation/encryption techniques can also be applied to the encoded text, such as padding through the addition of one or more missing zeros from a first hexadecimal string to a second hexadecimal string (e.g., equalizing string lengths), etc.

In some embodiments, the construction/deconstruction process may be a two-step process in which, in the context of constructing a message, a plaintext message is first encrypted using various encryption techniques (e.g., using a public key or a private key), and then mapped to a particular human-readable phrase (e.g., being hashed to a particular lyric, quotation, etc., from a codebook). For messages constructed in this manner, deconstruction may similarly be a two-step process where the ciphertext may utilize one or more codebooks to determine the mapping of the phrase, and then decrypted using a key. The encoded message may still be comprised of ciphertext that is a human-readable phrase (e.g., thaṭ is ā hoṭ g1rl).

As an example, the following steps may be used to encode/decode a message:

1. A sample message, "that is a cat" may be broken down into character numbers for each word in the message (4 2 1 3 in letter-space sequence). (If the message length is greater certain size will split that message in two or more for further process).

2. A similar letter-space sequence search may be conducted in the codebook library.

3. A specific key may be generated for each message, which will contain the user key, codebook info, message expiry timeline, and a unique message id.

4. The unique message key will be used to generate the encoded text from the input text.

5. The encoding of the message uses the codebook and the message key, mapping extended characters (e.g., UTF-8) to standard characters (e.g., ASCII English characters). The resultant message may be readable by a human but may not be interpretable by a machine.

In some embodiments, the construction/deconstruction process need not be reversible by a content creator; for example, construction may be effected using a public key, and deconstruction may be effected using at least the corresponding private key. For example, a fan seeking to send an encrypted message to a celebrity may utilize the celebrity's publicly curated key for the encryption of a message to be sent, and the celebrity may utilize the celebrity's corresponding private key to decrypt the message.

The construction/deconstruction subsystem 108 may be configured to append, transform and/or modify message during the conversion, such as adding a link (e.g., to a website where keys and/or codebooks can be purchased), advertising messages, message identifiers, etc.

The construction/deconstruction subsystem 108 may be configured to select one or more codebooks and/or one or more extended character sets based on the readability of the output ciphertext. For example, the UTF-8 extended character set was originally designed to support foreign languages, and accordingly, some extended characters may have differences in appearance from English characters.

While extended characters may have some similarities in appearance to English characters, there may be differences in the degree of similarity. In some embodiments, the construction/deconstruction subsystem 108 may be configured to associate a readability maximization factor to characters in an extended character set, based on the level of their similarity to a particular English character and other alphabets and languages as applicable.

In selecting a set of extended characters for the ciphertext, generating a codebook or selecting a specific phrase, the construction/deconstruction subsystem 108 may be configured to select a phrase or characters where there is a highest aggregate readability maximization factor (RMF).

In some embodiments, the RMF associated with a character and/or a set of words (e.g., a phrase) may be provided through various sources, such as provided from an external database 120, updated over time through user acceptance testing, etc. Increasing the aggregate RMF associated with a set of words may aid in the readability of the phrase as a human, but may impede the ability for machines to interpret the meaning of the phrase.

In some embodiments, when selecting a set of output ciphertext, a user, through the user interface subsystem 102, may be provided decision support through the display and potential ranking of output ciphertext based on their associated and/or aggregate RMF values.

The notification engine 110 may be configured to send out one or more notifications to various users, such as content consumers, content creators, the general public, administrators, etc. For example, a content creator and/or an administrator may wish to send out a message to a particular group, etc., notifying that new content is available, an updated codebook is available, access may be purchased for a particular key, a key has been changed, etc.

The media platform integration subsystem 112 may be configured to provide various integration capabilities with one or more media platforms 140. For example, the media platform integration subsystem 112 may be configured to generate messages that may be compliant with the particular constraints and/or limitations of a media platform 140 (e.g., only particular extended character sets are permitted, there may be limit on the number of characters sent, there may be restrictions in regards to permitted links being sent, etc.). In some embodiments, the media platform integration subsystem 112 may be configured for the transmission of encrypted messages to a number of media platforms 140, such that the messages may be configured suitably for the selected media platforms 140.

The media platform integration subsystem 112 may be configured for an encoded message to be sent through various media platforms 140, and the media platform integration subsystem 112 may be configured to store, determine suitable encoding and/or adapt message encoding based on various limitations and/or capabilities offered by the media platforms 140. In some embodiments, various messages, hashtags, and other any other content may be appended to an encoded message. For example, an encoded message may also include advertisements and/or messages from advertisers.

In some embodiments, a sponsored advertisement message may replace the user's chosen output ciphertext or may be appended to the end of the posting on the media platform as a separate message.

For example, posting a message to a media network may include various formats, such as (1) [encoded text UTF-8/sponsored ad message][system url to conversation] and (2) [encoded text][system url to conversation][sponsored ad message], and in some embodiments, a sponsored ad message can replace the user chosen output or be appended to the end of the a message.

Figure 10:
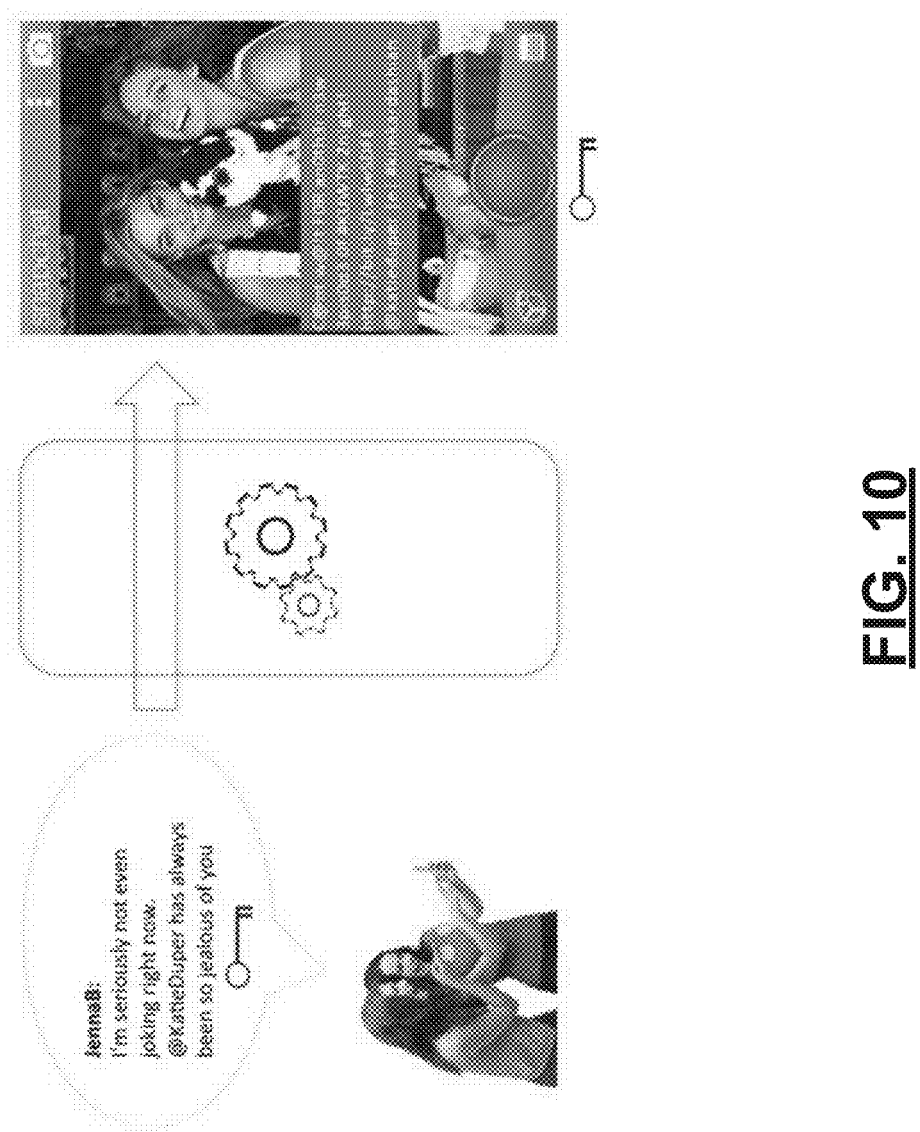
FIG. 10 is a sample screenshot where a message is encoded by a user and the ciphertext representing the encoded message may be include a phrase, along with a link and advertisement messages, according to some embodiments.

FIG. 10 is a sample screenshot where a message is encoded by a user and the ciphertext representing the encoded message may include a phrase, along with a link and advertisement messages, according to some embodiments.

In some embodiments, the key/codebook management subsystem 114 may be configured to generate, update, maintain, scramble, modify, and/or transform various source libraries, codebooks and/or keys stored in the database 120. For example, source libraries may include various phrases and/or sentences from one or more songs, movies, quotations, books, speeches, etc., and these source libraries may be utilized in the generation of one or more codebooks. The particular source libraries may include phrases and/or sentences that may be in standard character sets (e.g., single ASCII/English representation), and these source libraries may be converted into codebooks through the substitution, application and/or mapping of standard character set characters to extended character sets.

In some embodiments, the source libraries may be selected from various advertiser-related ciphertext, such as corporate mottoes, etc.

There may be one or more mappings provided that provide relationships between extended character sets and standard character sets, and these mappings may be associated with one or more readability maximization factors (RMFs) indicative of the ease in which a human reader would associate an extended character with a particular standard character.

Figure 11:
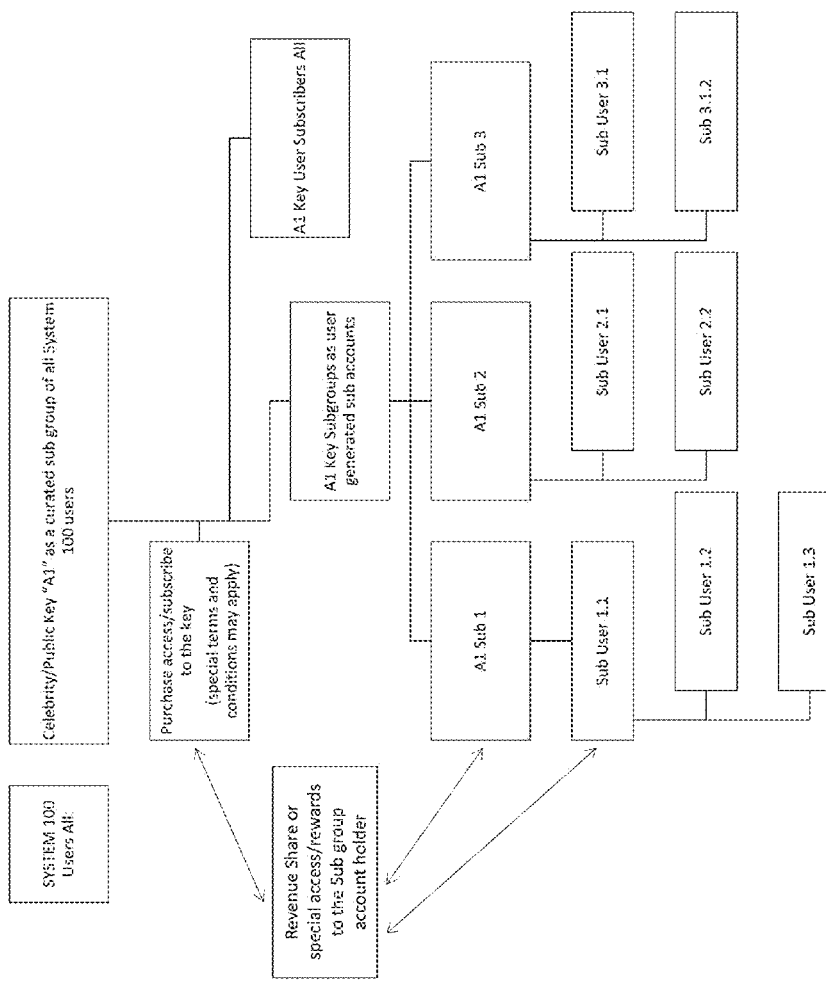
FIG. 11 is an example schematic diagram illustrating a sample hierarchical key distribution involving a particular curated key being distributed to various subgroups, subaccounts, and subscribers, according to some embodiments.

FIG. 11 is an example schematic diagram illustrating a sample hierarchical key distribution involving a particular curated key being distributed to various subgroups, subaccounts, and subscribers, according to some embodiments.

Figure 12:
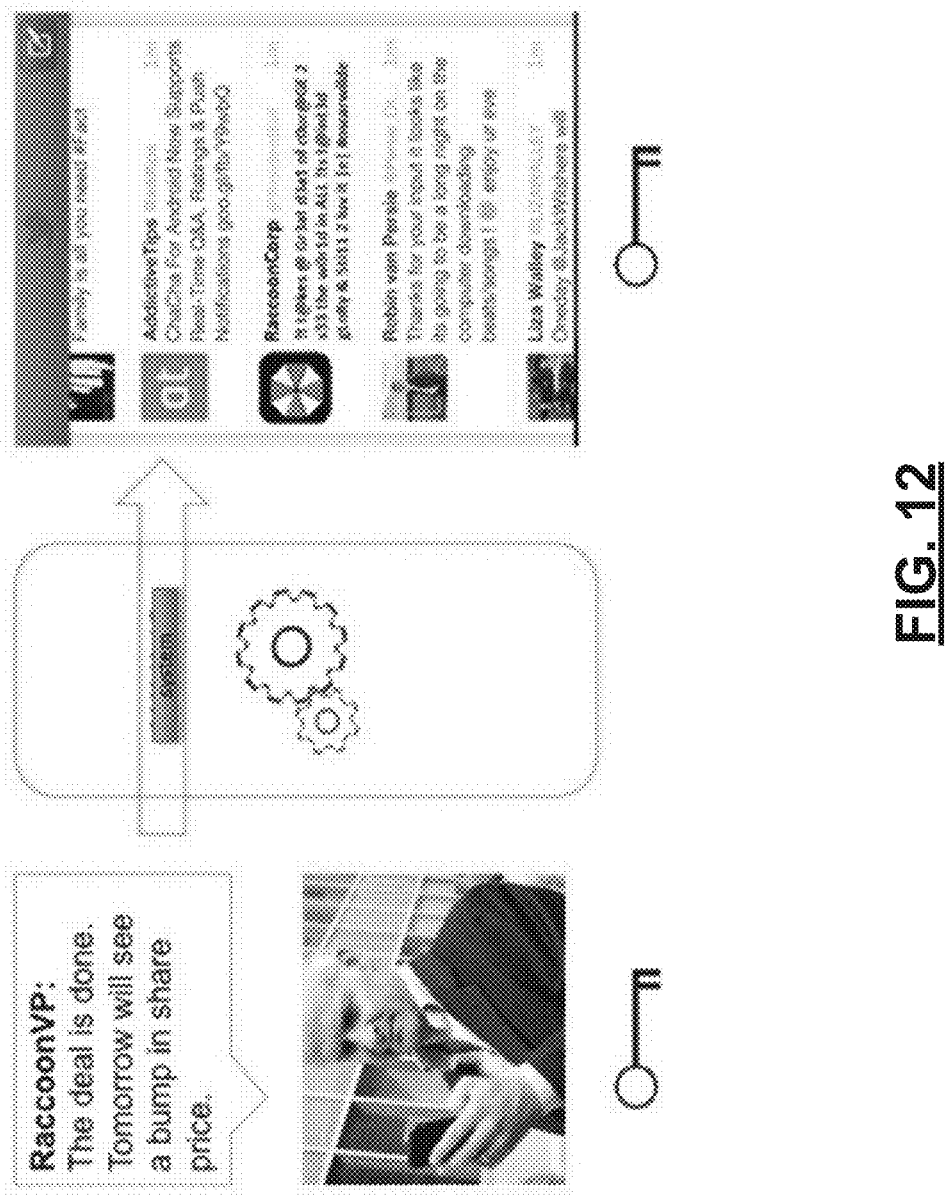
FIG. 12 is a sample screenshot where a message is encoded by a corporate user to encode a sensitive message, according to some embodiments.

FIG. 12 is a sample screenshot where a message is encoded by a corporate user to encode a sensitive message, according to some embodiments.

Figure 13:
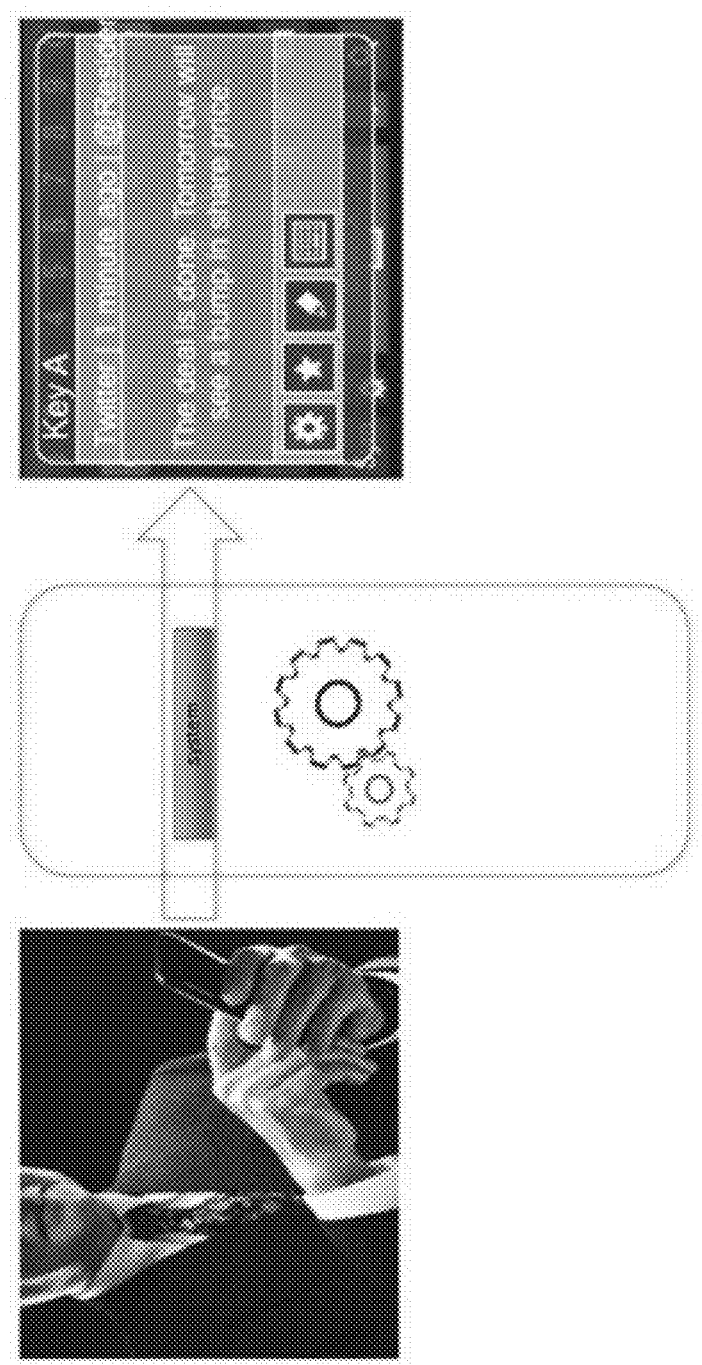
FIG. 13 is a sample screenshot where the encoded message of FIG. 12 is decoded, according to some embodiments.

FIG. 13 is a sample screenshot where the encoded message of FIG. 12 is decoded, according to some embodiments.

The key/codebook management subsystem 114 may be configured for the scrambling of codebooks based on various scrambling factors, such as scrambling using various transformations (e.g., rotations, shifting, substitutions). For example, encoding using a particular codebook may include not only a specific codebook, but also the application of one or more scrambling factors.

The use of one or more scrambling factors may increase the potential security and reliability of an encoded message (e.g., an unauthorized user may find it more difficult to decipher the encoded message without the requisite codebook/scrambling factors).

In some embodiments, the scrambling factors may not be bidirectional. For example, a scrambling factor may only be used one way to scramble a codebook, and a separate factor may be necessary to unscramble the codebook after it has been scrambled. There may be various advantages to using unidirectional message encoding, for example, the ability to send messages that may be more resistant to tampering by a third party, increased resilience to code-breaking attempts, etc.

The key/codebook management subsystem 114 may be configured to distribute and/or track the distribution of various keys, codebooks, scrambling factors, etc., among users and/or groups of users. For example, the key/codebook management subsystem 114 may be configured to utilize the notification engine 110 to provide updated keys and/or codebooks to a selected group of individuals, to track the use of keys and/or codebooks, to disseminate keys/codebooks, etc.

Figure 14:
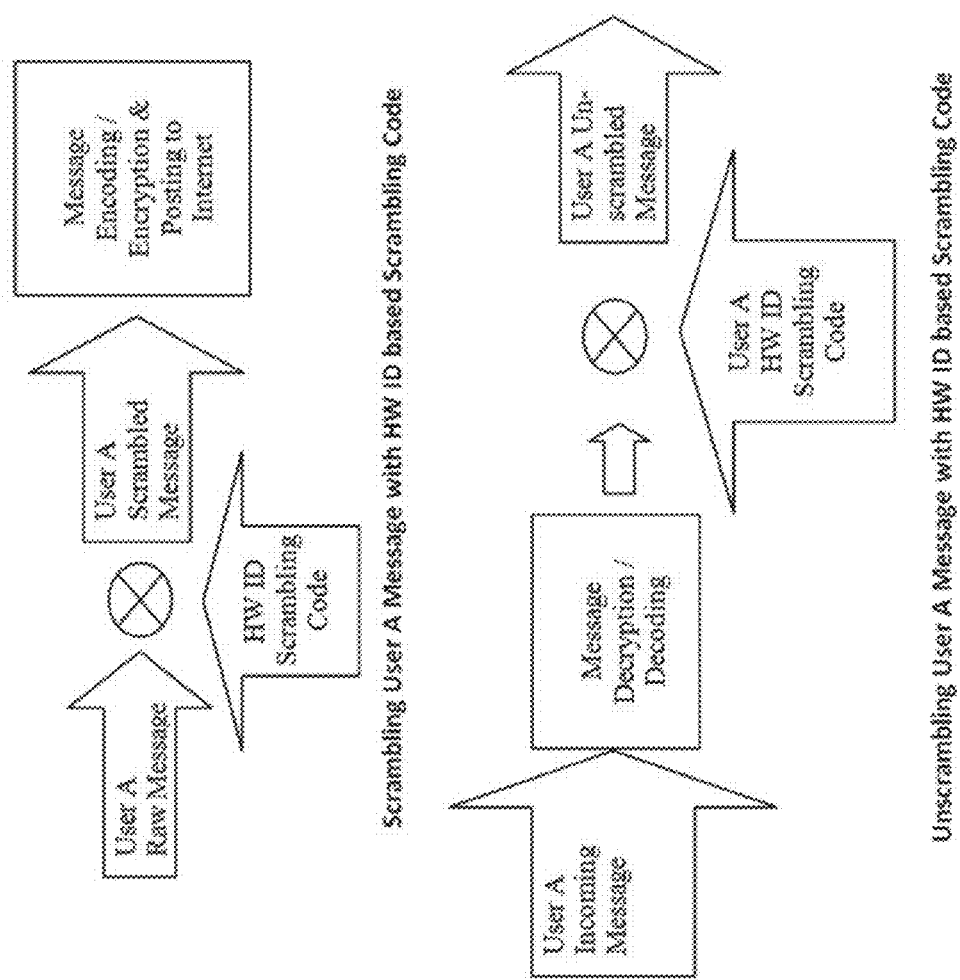
FIG. 14 is a data flow diagram where a scrambling code is used to encode and decode a message, according to some embodiments.

FIG. 14 is a data flow diagram where a scrambling code is used to encode and decode a message, according to some embodiments.

The user profile management subsystem 116 may be configured to create, update, maintain and/or delete various profiles associated with users. Information that may be included in a profile may include advertising preferences, demographic information, associated keys/codebooks/scrambling factors, historical messages, system usage, name, associated IP addresses, participation in various groups, etc.

A user may also identify particular groups and associate various activities to them, such as groups who should be notified when content is posted, groups who should be distributed various keys/codebooks, etc.

In some embodiments, the user profile management subsystem 116 may be configured for use in monetizing various aspects of use, such as the dissemination of keys/codebooks, the purchase of keys/codebooks, payment based on the number of times a message has been decoded, etc.

In some embodiments, monetization may be provided in the form of virtual currency associated with a user's profile. In some embodiments, there may be various types of electronic credits associated with a user's profile. The electronic credits and/or virtual currency, for example, may be exchanged for various services, and/or tracked in the form of leader tables, top user tables, etc. In some embodiments, the virtual currency and/or electronic credits may be exchanged for fungible legal tender. In some embodiments, the virtual currency and/or the electronic credits may be earned through various activities, such as the distribution of a particular key, referrals, the use of a distributed key, etc.

The advertising network subsystem 118 may be configured for the administration and inclusion of various advertisements into various encoded and/or decoded messages. The advertising network subsystem 118 may be configured to incorporate (e.g., append a message, select ciphertext from a sponsored codebook, add a URL, add a hash tag) various advertising messages into encoded messages. In some embodiments, decoded messages may have various advertising messages incorporated into them.

For example, a user may wish to encode a message. The resultant encoded message may be encoded based on an advertiser's codebook (e.g., the encoded message of FIG. 10 may be based on a codebook from an entertainment company seeking promote an episode of a show). In some embodiments, a user decoding an encoded message may be provided an advertisement appended to the underlying decoded message.

The advertising network subsystem 118 may be configured to interoperate with various external advertising networks and/or exchanges, such as Google Ads™, DoubleClick™, etc. The interoperation, may, for example, include the selection, tracking and/or transmission of suitable advertising phrases and/or messages.

In some embodiments, the advertising network subsystem 118 may be configured to communicate with one or more external platforms associated various advertisers, and receive various codebooks and/or messages directly from computing systems associated with the advertisers (e.g., through an API).

The database 120 may be implemented using various database technologies, such as relational databases (e.g. SQL databases), flat databases, excel spreadsheets, comma separated values, etc. If the database 120 is implemented using relational database technology, the database 120 may be configured to further store relationships between various data records. The database 120 may be implemented using various hardware of software technologies, such as solid state or hard disk drives, redundant arrays of independent disks, cloud storage, virtual storage devices, etc.

The database 120 may store various elements and/or records of information, such as prior message postings, encoded messages, unencoded messages, hashing functions, encryption keys, codebooks, scrambling factors, user profiles, advertising information, advertiser messages, media platform characteristics, dissemination groups, etc. The database 120 may be configured to store various elements of metadata, such as metadata indicating the relationship between various elements, etc.

FIGS. 15-20 are sequence diagrams illustrating various implementations of the system 100, integrated at different stages of communications, according to some embodiments.

As an example, during operation, a user of the system (the poster) posts to an arbitrary social network. This post includes a unique url, uri, urn associated with that post (knows as a link to the specific conversation). This post and url can be seen and interacted with by anyone on that social network. Full interaction or message decoding may require a client associated with the system, and, for example a registered user account, a specific conversation identifier, and authorization from the poster.

Figure 15:
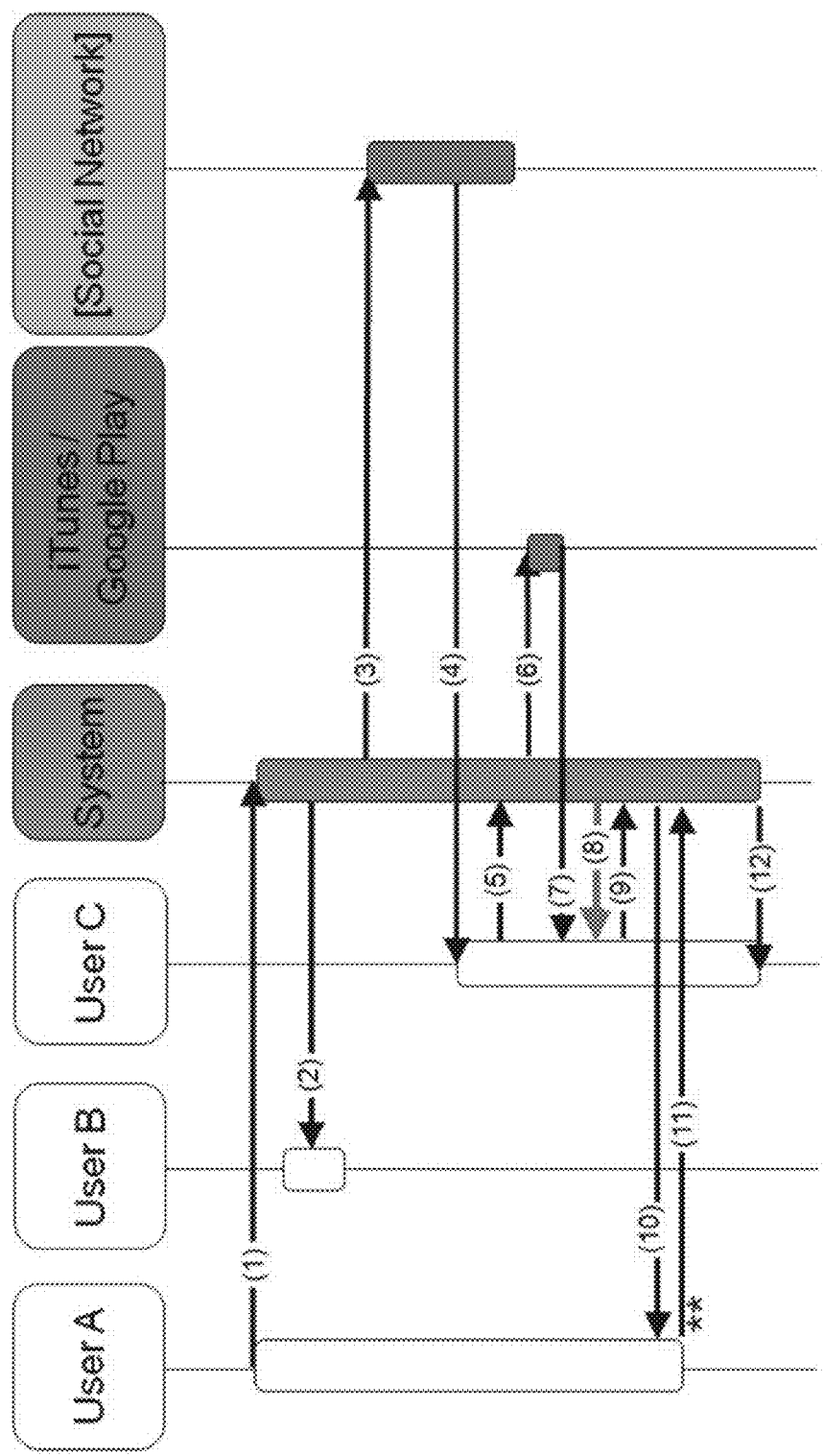
FIGS. 15-20 are sequence diagrams illustrating various implementations of the system, integrated at different stages of communications, according to some embodiments.
Figure 16:
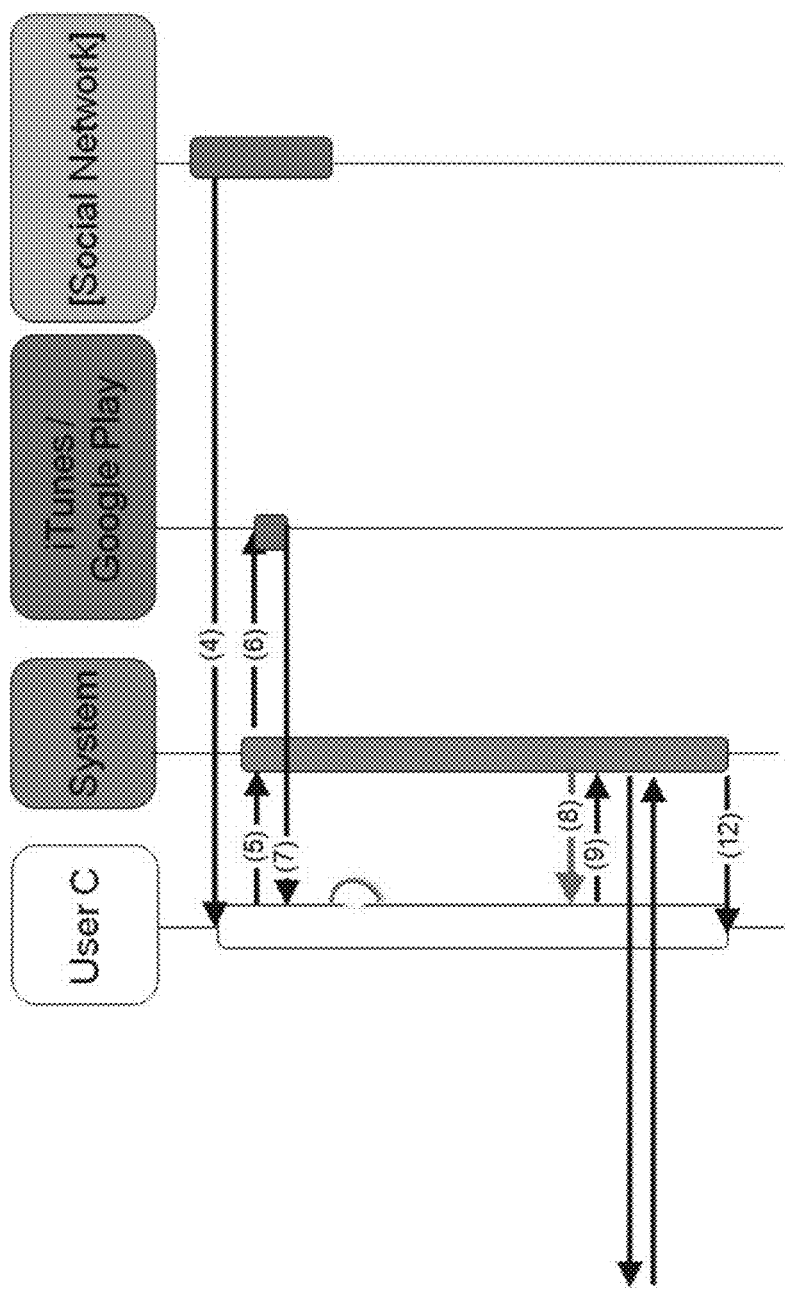

In relation to FIG. 15 and FIG. 16, there may be a need for the maintenance of conversation continuity where a user is looking to download a client associated with the system, for example, through an application store such as iTunes™ or Google Play™. For example, new users without a client associated with the system (e.g., a mobile application) may lose the specific conversation association when they leave a specific conversation url landing page to download the client from an application store.

When a visitor from a mobile browser lands on a specific conversation landing page (4), a server associated with the system may be configured to record the browser identifiers and time stamp the visit (5). The browser identifiers will be used to identify new users who register. The server associated with the system may be configured to calculate the time between landing page visitors and new user registrations.

New users who register within a given time period from specific conversation landing pages visits may be provided suggestions from the system on potential relevant specific conversations.

This given time period will be based on and improved upon through the following factors:
- Regional location
- Carrier and associated carrier download speeds
- Mobile platform and OS version
- Device specific application install capabilities Time to register as a user may not be a factor as once the application installs and runs for the first time, it may be configured to notify the server associated with the system of this activity (9). This first-run time notification may be used to calculate the relevance/correlation factor of specific conversations to new users registering (8).

Figure 17:
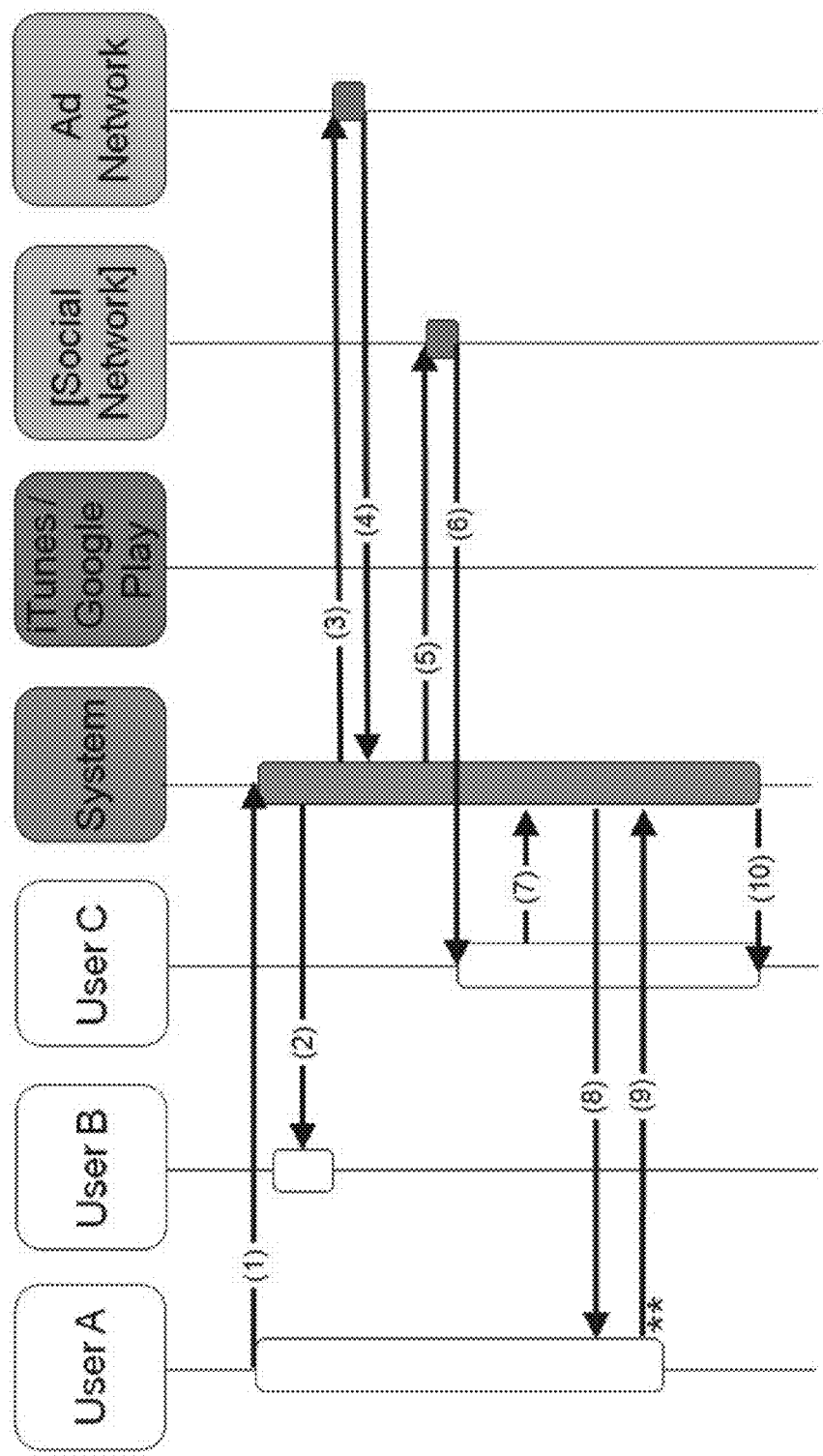
Figure 18:
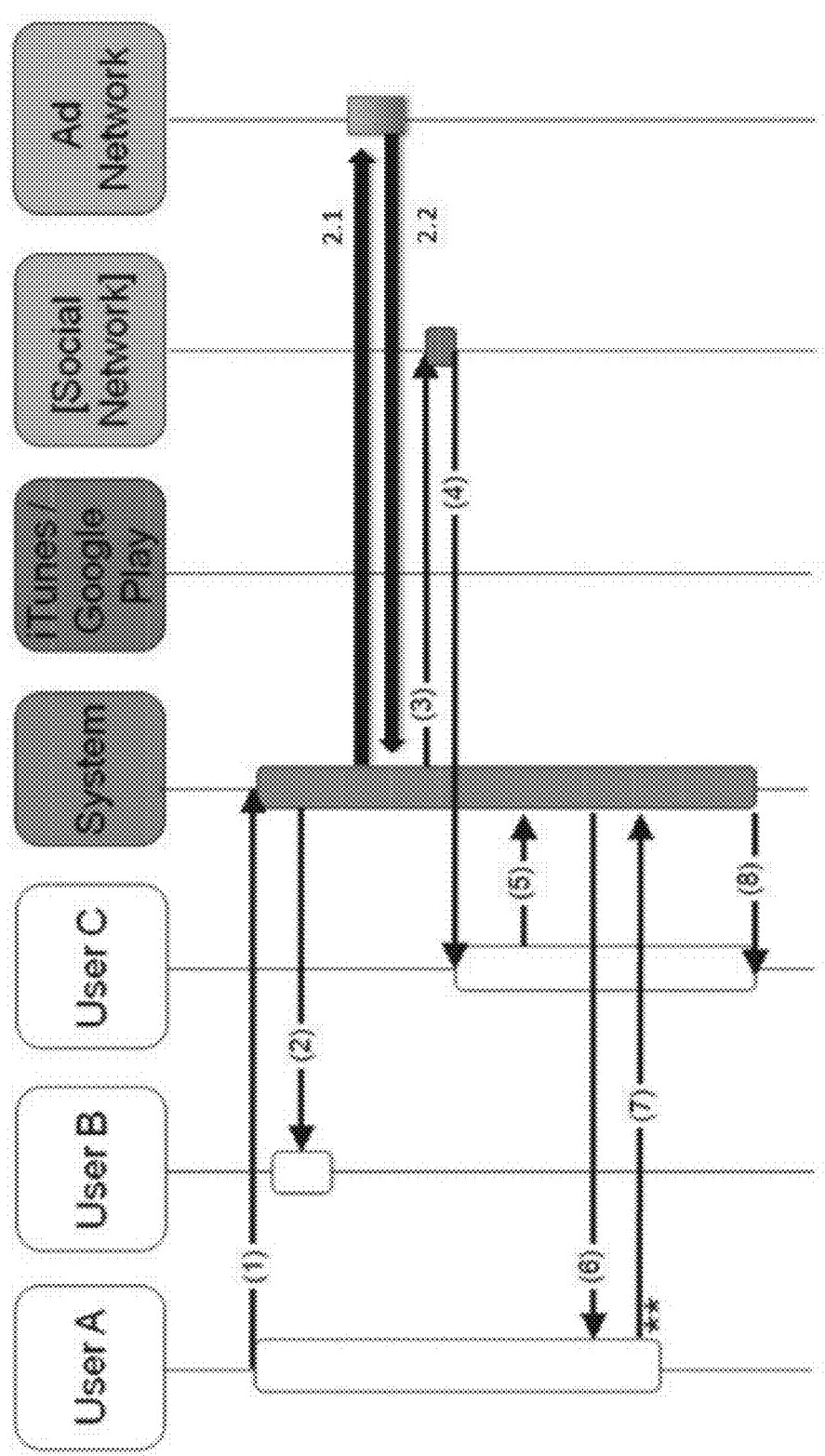
Figure 19:
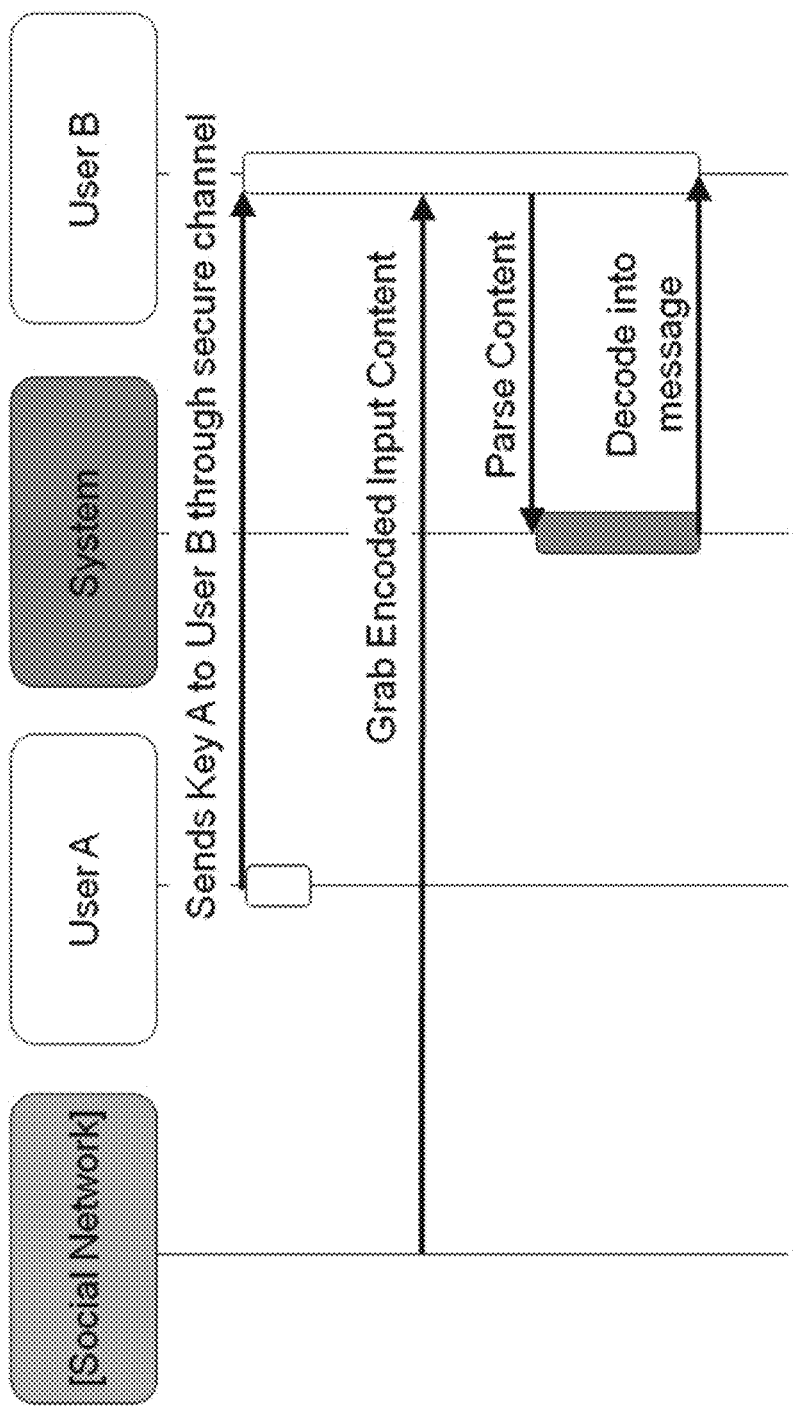
Figure 20:
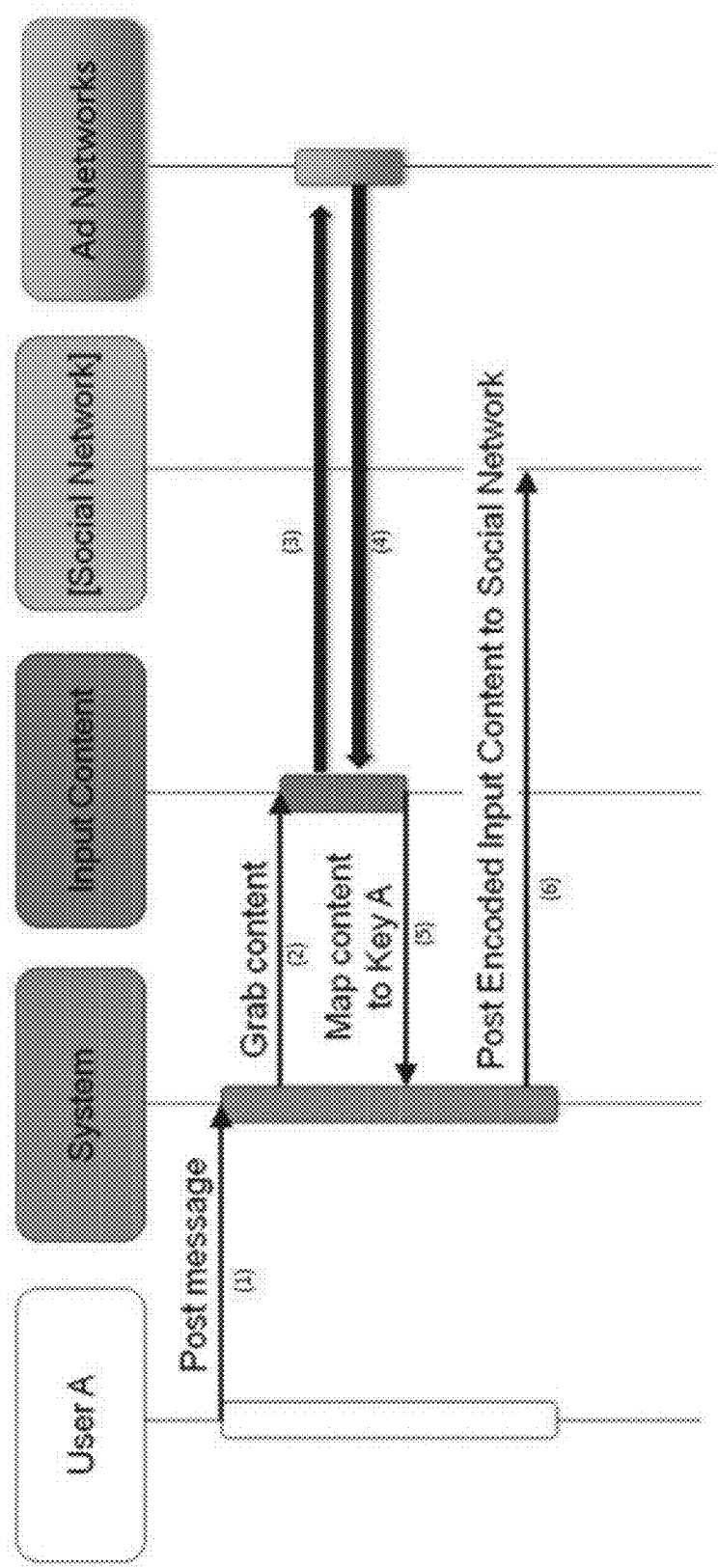

In relation to FIG. 17, the system may be configured to dynamically create media network content on behalf of user B using user A's media network content (NCA) as an argument to a function of user B's media network content (NCB). As an example, a post may be structured as: [@target(s)][NCB][#NCA][System-generated url].

A server associated with the system may be configured to make a dynamic call (3) to the 3rd party/partner advertising network for a codebook related posting (e.g., a tweet) (4).

User A does not have to be related to user B at all.

Specific Encoding Examples

Codebooks may be generated and/or applied in various ways. The following is an example, according to some embodiments, where a code book is (a) a collection of pre-selected phrases, words, and letters which are indexed and selected to produce a readable output message with meaning.

Codebooks may include but not limited to phrases which are subsets of song lyrics, famous quotes, or expressions. In addition, code books may contain the most common words, grouping of words and all letters and punctuation in the English alphabet.

Codebooks may be stored on the server, cloud and/or locally on the device. The code books may be freely available to users for us or may be required to be purchased.

One or more mapping tables may be used to identify and/or apply various output characters based on an input, such as an English input character. The mapping table may be designed to provide a valid list of output characters for a given specific English input character, A mapping table may be pre-assembled based on the RMF.

For example, the English character "A" or "a" can be represented by UTF-8 characters with hexadecimal representation of c3a0 (LATIN SMALL LETTER A WITH GRAVE), c3a1 (LATIN SMALL LETTER A WITH ACUTE), c3a2 (LATIN SMALL LETTER A WITH CIRCUMFLEX), c3a3 (LATIN SMALL LETTER A WITH TILDE), c3a4 (LATIN SMALL LETTER A WITH DIAERESIS), c3a5 (LATIN SMALL LETTER A WITH RING ABOVE) and other characters as determined by the RMF.

The following paragraphs describe the encoding of various example phrases. The examples are merely provided to illustrate some embodiments, there may be other and/or different embodiments contemplated.

In describing the examples, various terms may be utilized, for example:

$I_{PHRASE}$: Input phrase directly from the user or from a machine generated process $CB_{PHRASE}$: Output phrase as derived by the Code Book Function $O_{PHRASE}$: Output phrase as derived by the Mapping Function $P_L$ (Phrase Length): Number of characters including punctuation and spaces in a given phrase Word Sizes: Number of characters in a given word (excluding spaces but including punctuation)

Occurrence Rate: Number of occurrences of a given character in a phrase

Phrase Attributes: Attributes of the given phrase which describe the type of content in the phrase RMF (Readability Maximization Factor): A correlation factor used to determine the readability of a given character or the readability of a combination of characters adjacent to each other $D_L$ (desired length): Desired Output Phrase Length $M_I$ (Mapping Table Selection Factor); The index which determines which encoding type to use. Examples include UTF-8, UTF-16 along with others $f_{CB}(\ )$: Function which takes a input phrase, other variables (including a codebook) and outputs a new readable phrase as derived by the codebook and other factors $f_{MAPPED}(\ )$: Function which takes a input phrase, other variables (including a mapping table) and outputs a new phrase with the same message but different characters as per the selected encoding table (UTF-8, UTF-16, etc. . . . )

Code Books: A code book is (a) a collection of pre-selected phrases, words, and letters which are indexed and selected to produce a readable output message with meaning Mapping Table: The mapping table provides a valid list of output characters for a given specific English input character

Figure 21:
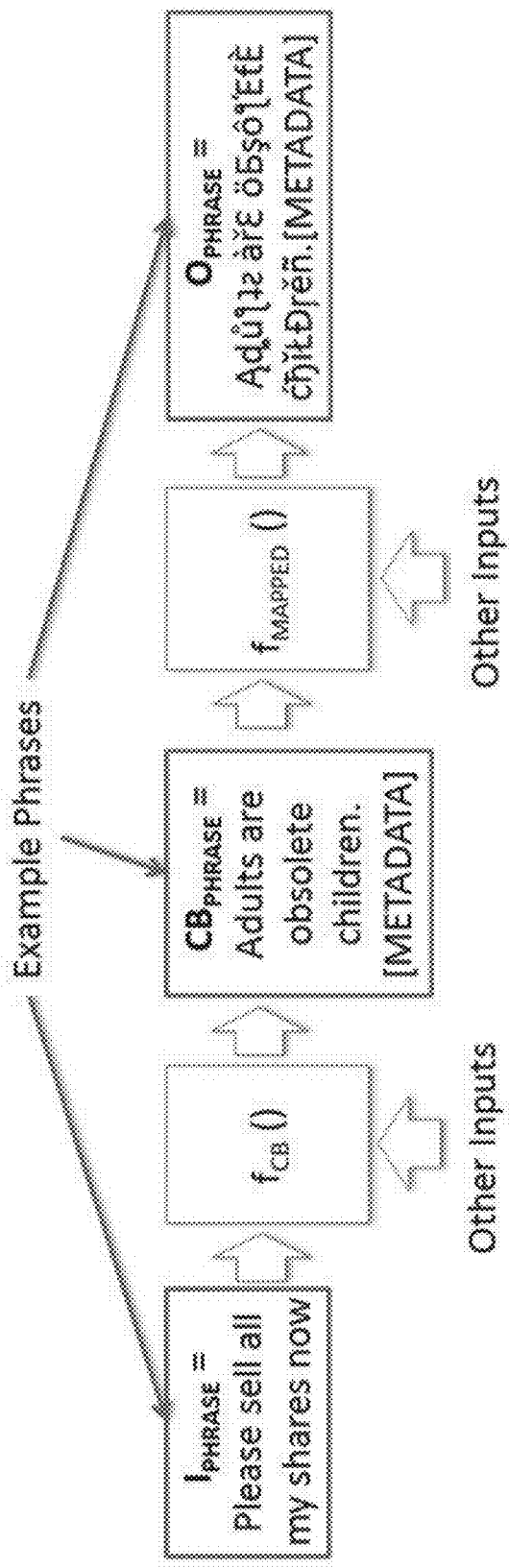
FIG. 21 is an example flow diagram where an input phrase, "Please sell all my shares now", is received by the system and a suitable codebook phrase is applied using $f_{CB}$, according to some embodiments.

[METADATA]: Extra information containing instructions on how to decode the message—in some embodiments, may not be required FIG. 21 is an example flow diagram where an input phrase, "Please sell all my shares now", is received by the system 100 and a suitable codebook phrase is applied to it using $f_{CB}$, according to some embodiments. In some embodiments, there may be a number of suitable phrases available from one or more codebooks and/or source libraries. Following identification of a suitable codebook phrase, $f_{MAPPED}$ is applied to convert the codebook phrase into a series of human-readable characters from an extended character set, and in some embodiments, metadata may also be appended to the output message.

FIG. 22 is an example workflow where $f_{CB}$ is applied in the example of FIG. 21, illustrating some inputs that may be used by $f_{CB}$ in selecting a phrase and/or metadata from the codebook, according to some embodiments.

Figure 23:
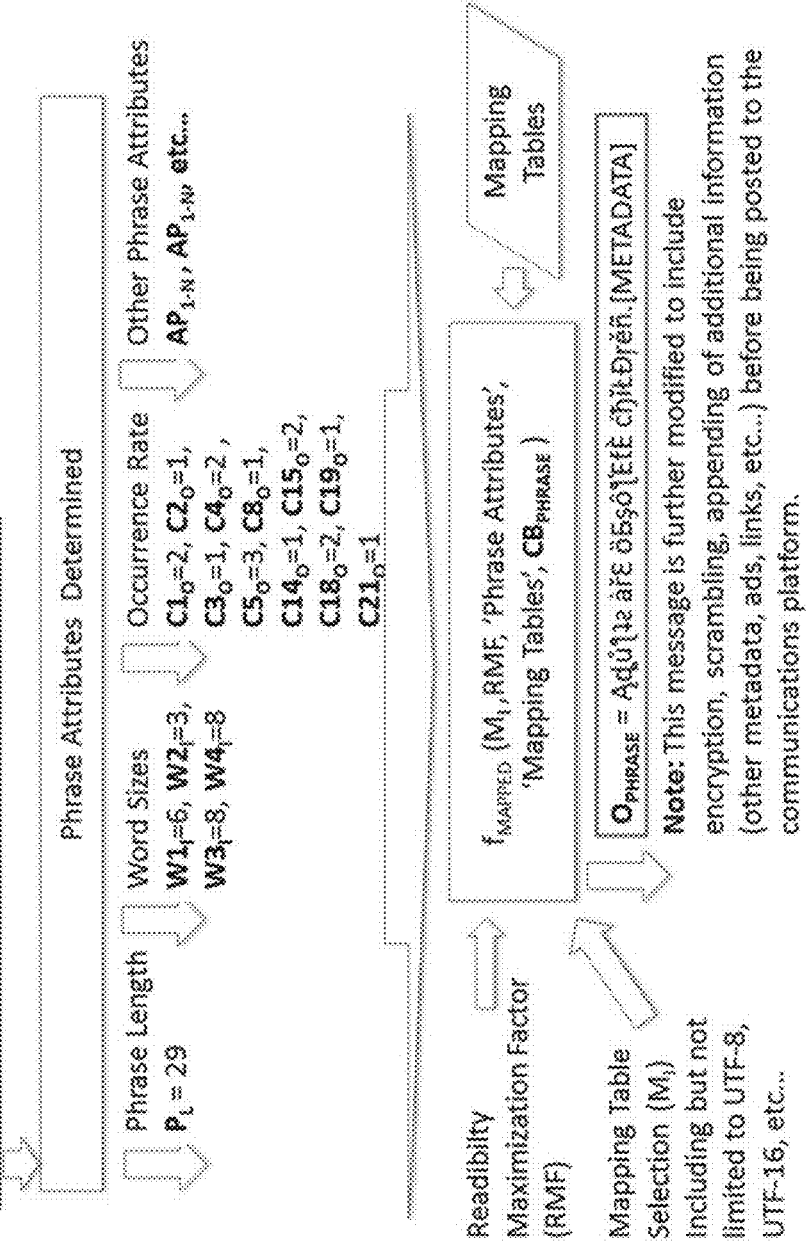
FIG. 23 is an example workflow where $f_{MAPPED}$ is applied in the example of FIG. 21, illustrating some inputs that may be used by $f_{MAPPED}$ in mapping selected extended characters to the normal characters of the output phrase of $f_{CB}$, according to some embodiments.
Figure 26:
FIGS. 26-36 are sample screenshots illustrating how an interface may be adapted for display through the user interface subsystem, according to some embodiments.
Figure 27:
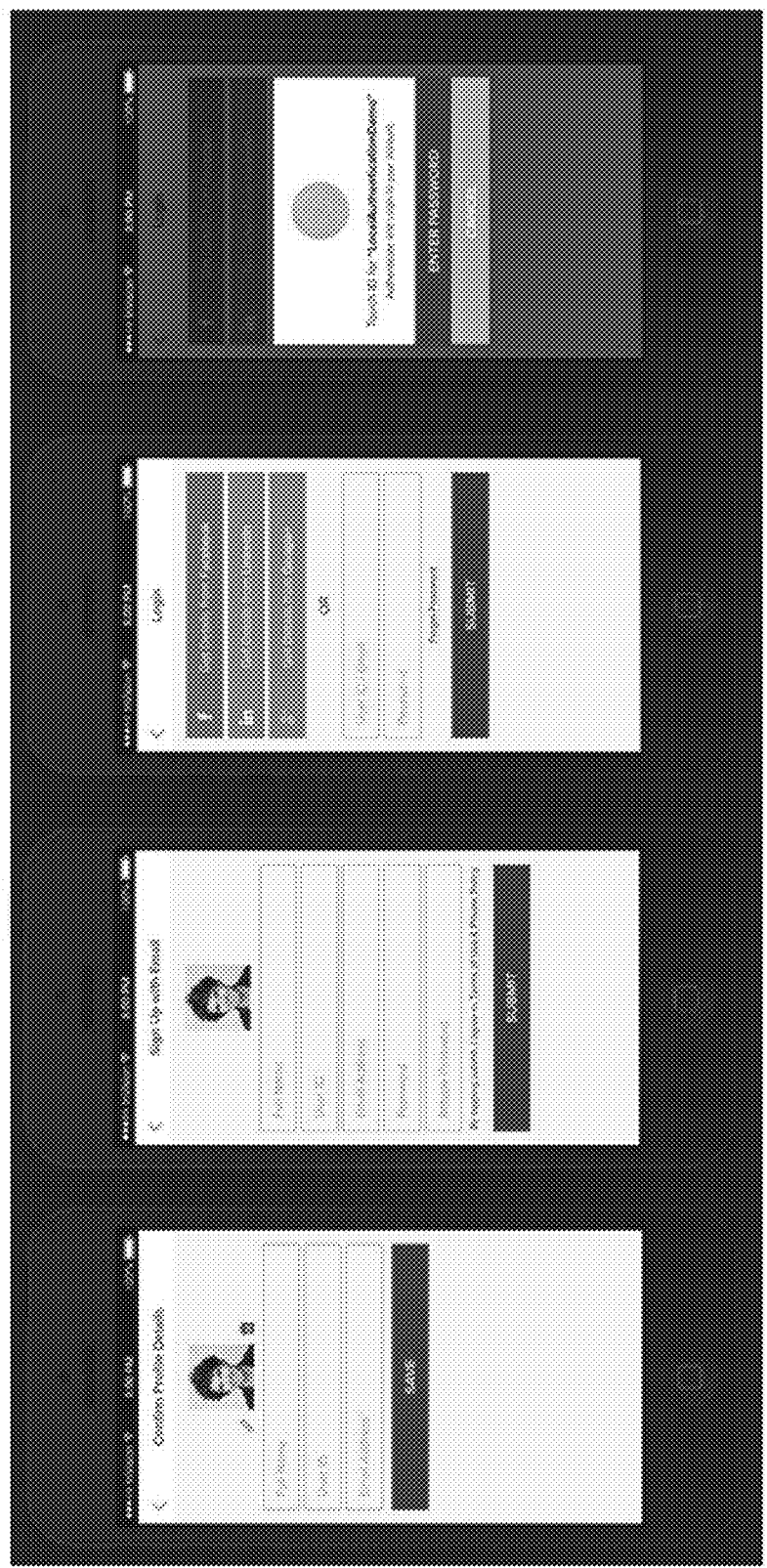
Figure 28:
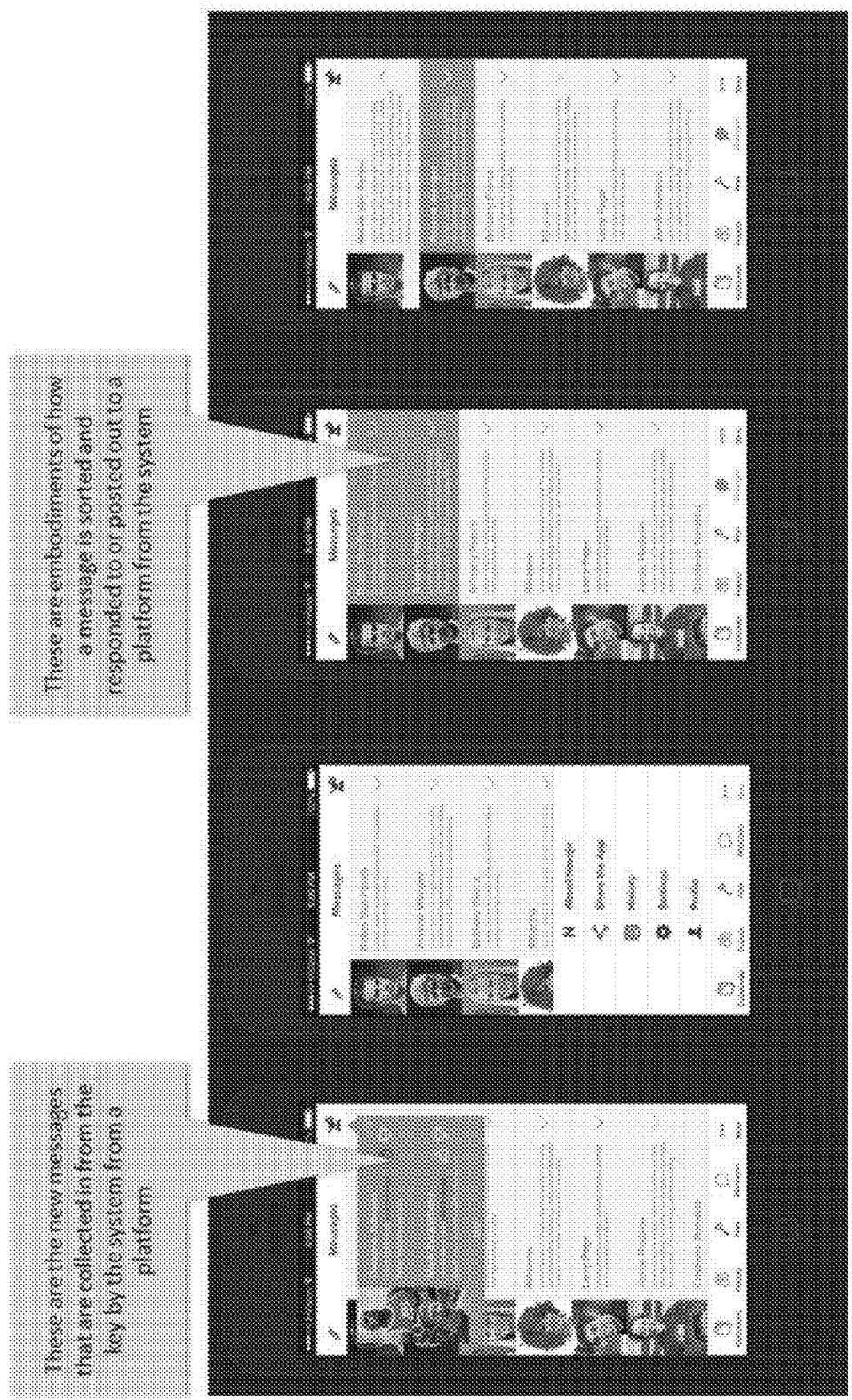
Figure 29:
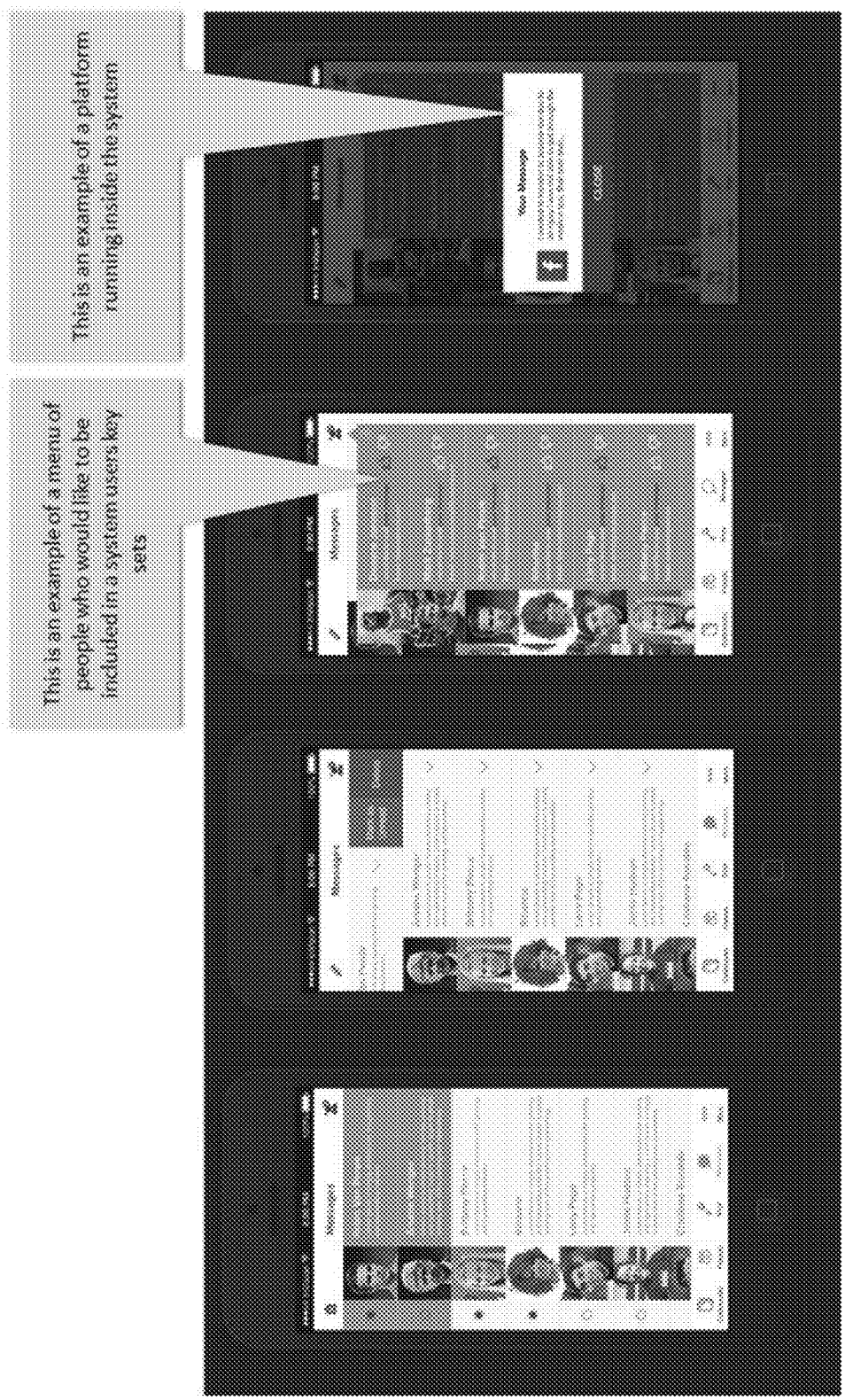
Figure 30:
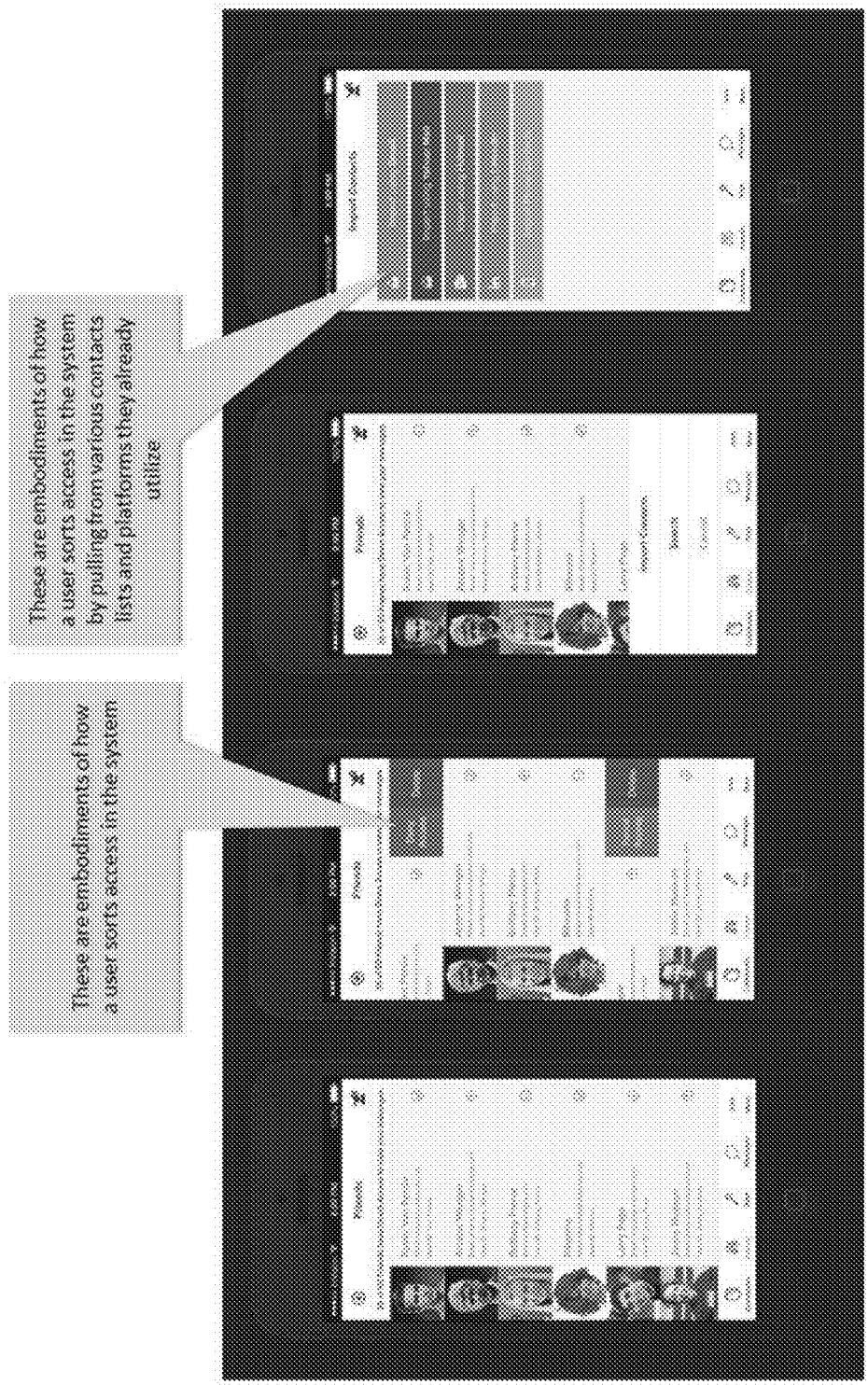
Figure 31:
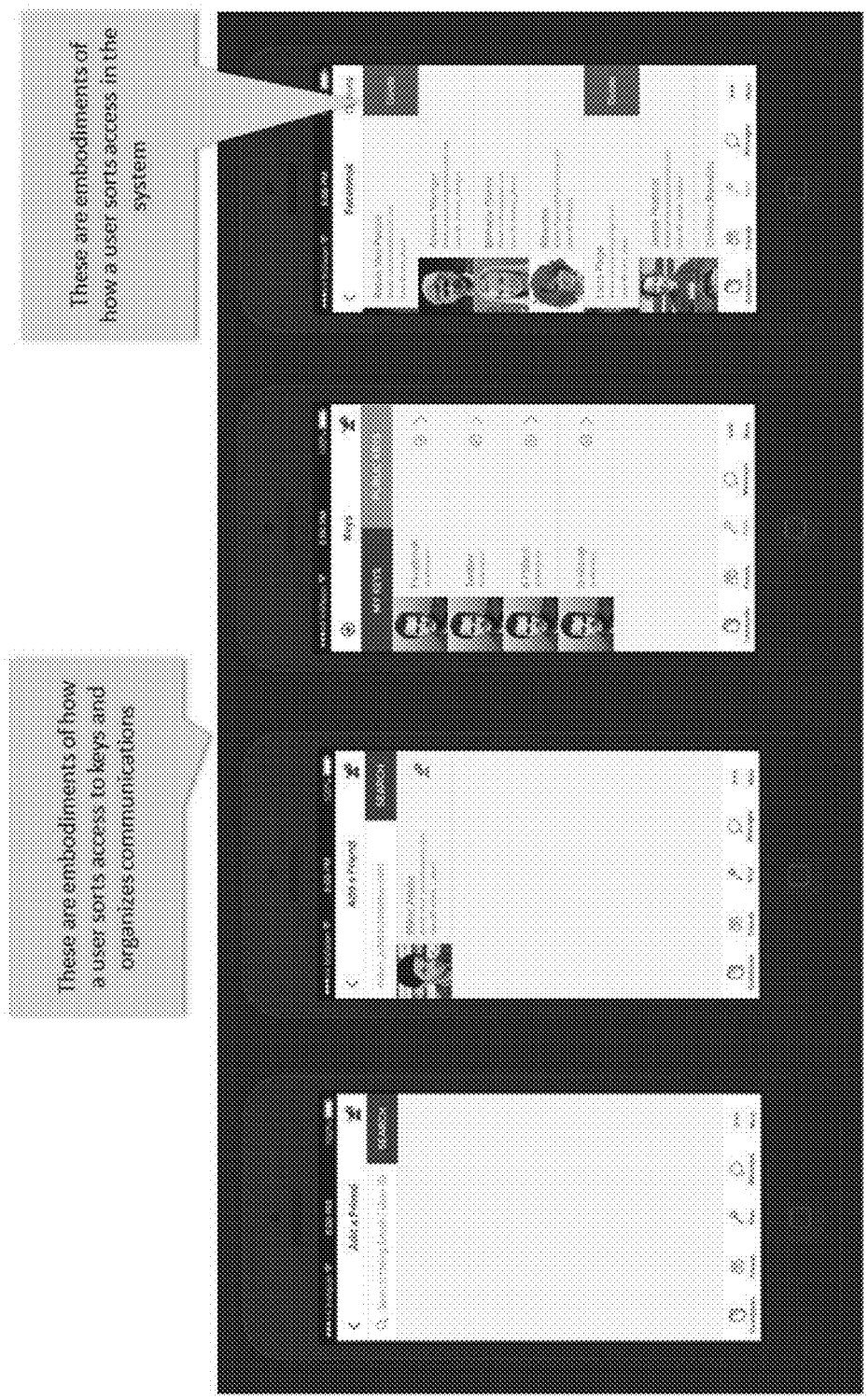
Figure 32:
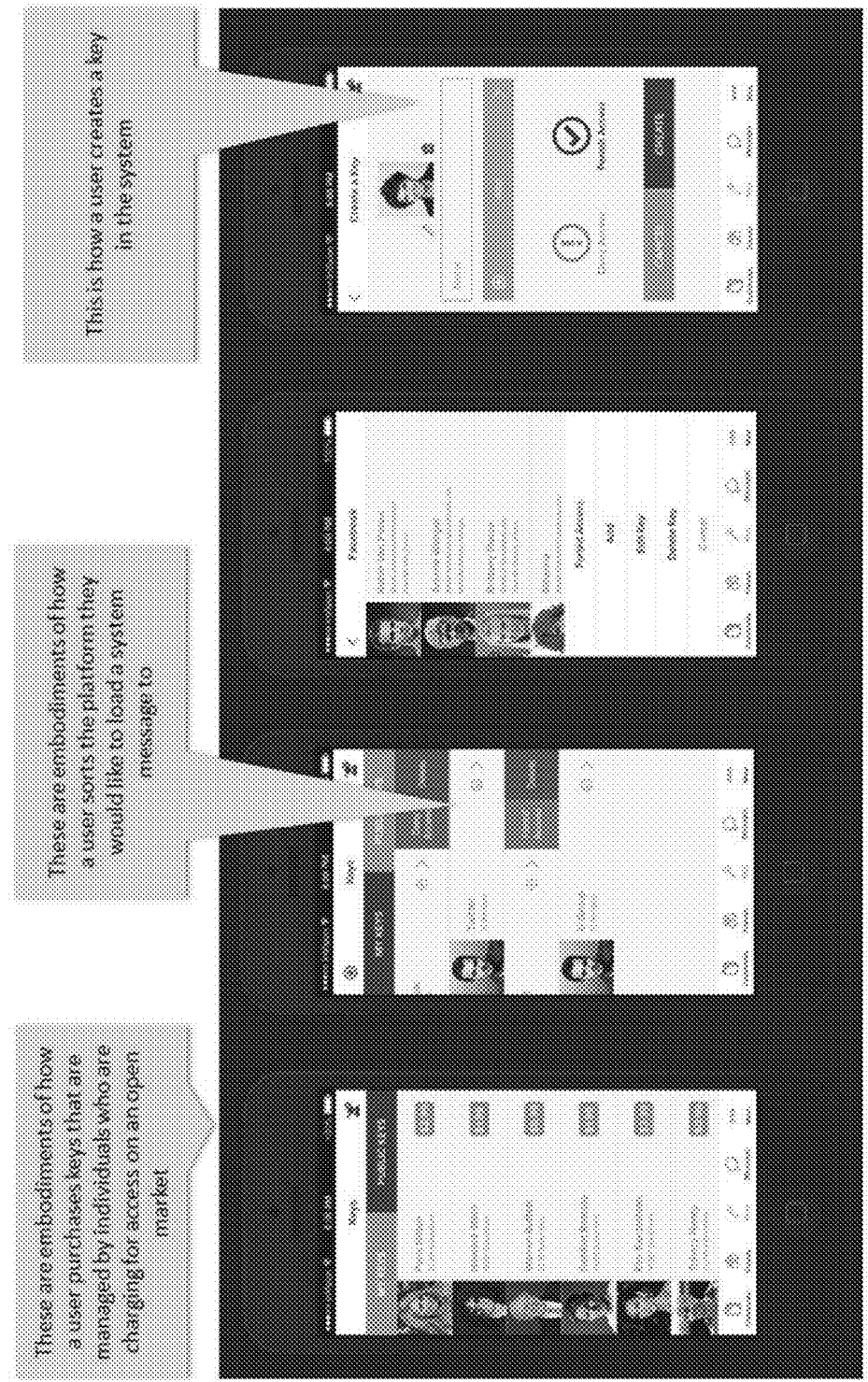
Figure 33:
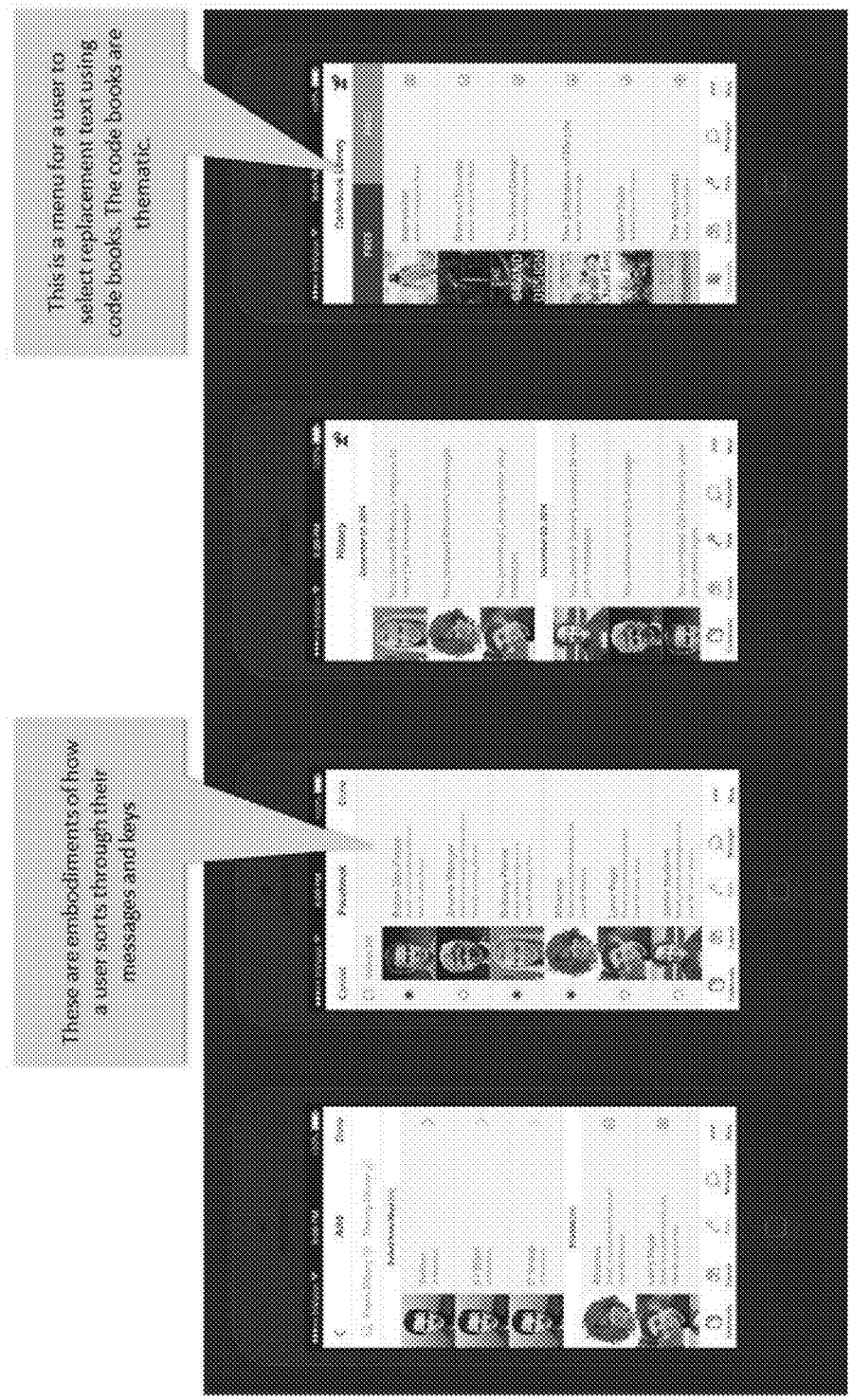
Figure 34:
Figure 35:
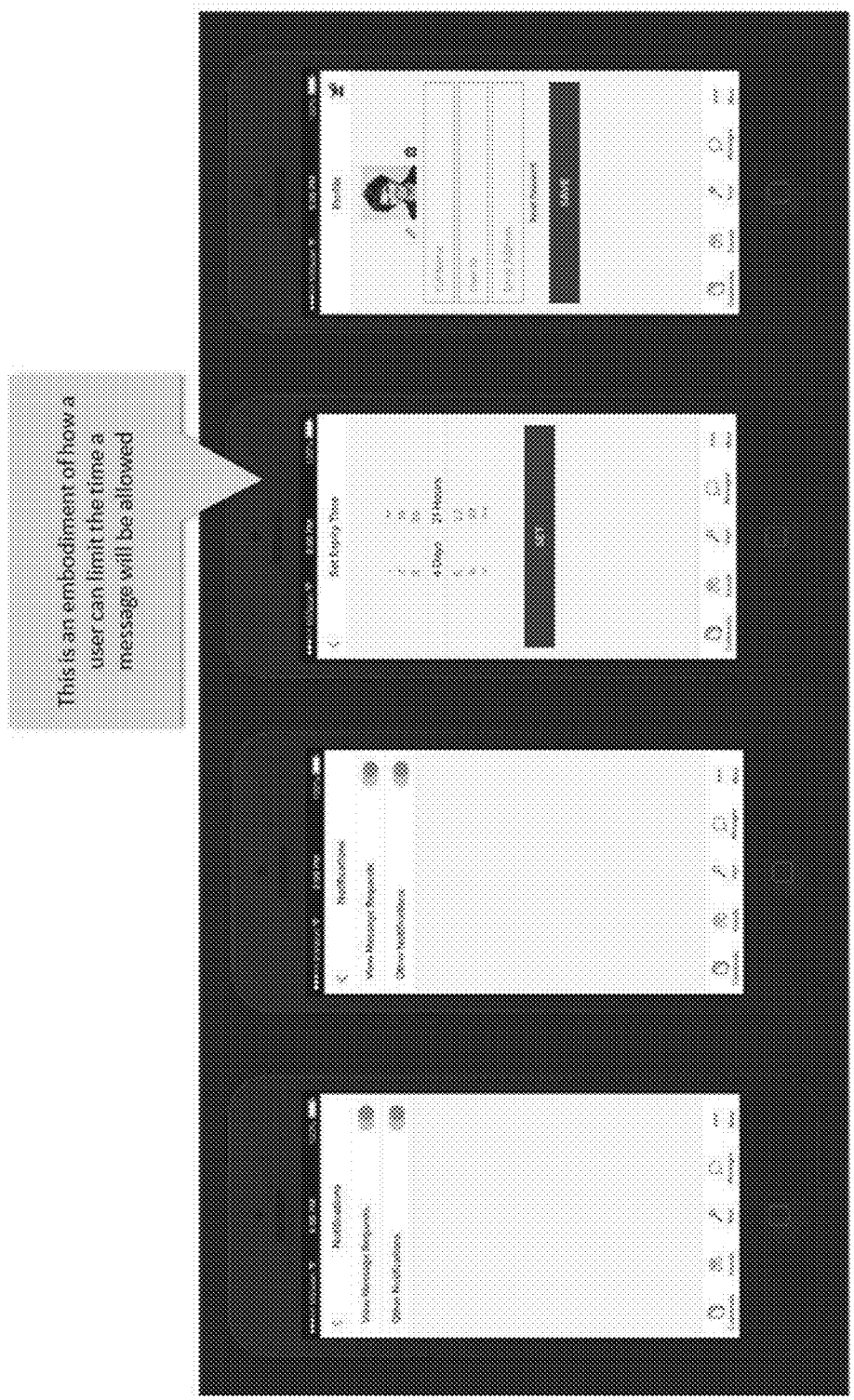
Figure 36:
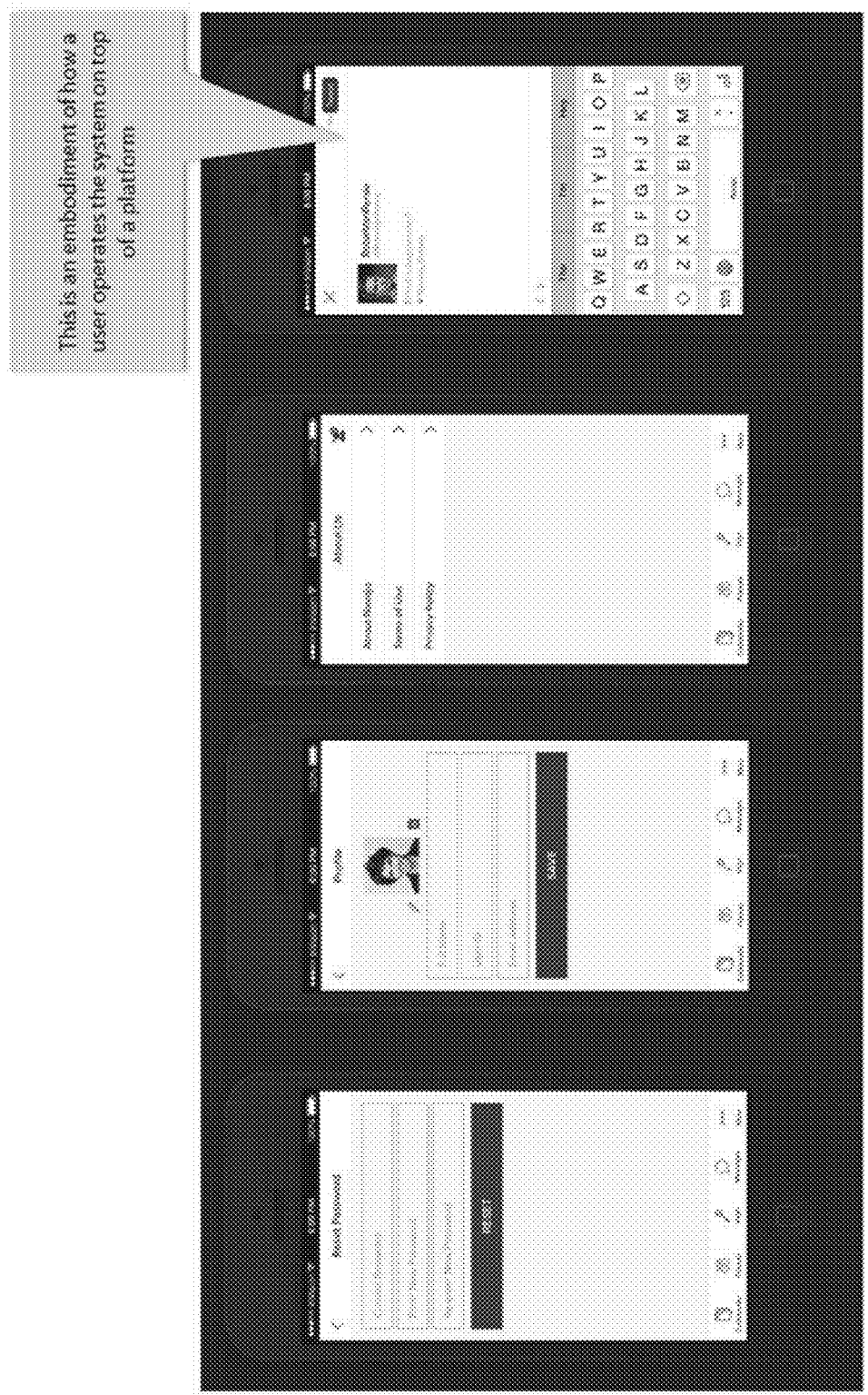

FIG. 23 is an example workflow where $f_{MAPPED}$ is applied in the example of FIG. 21, illustrating some inputs that may be used by $f_{MAPPED}$ in mapping selected extended characters to the normal characters of the output phrase of $f_{CB}$, according to some embodiments.

The above examples may, in some embodiments, include further encryption, scrambling, appending of information (other metadata, advertisements, links, etc.,), and may be used in a variety of environments, such as on devices as keyboards, on device applications, integrated into communication media/channels, integrated as part of an enterprise's communications systems, etc.

FIG. 24 is an example workflow where a particular letter, "A", is to be encoded in a message between two users having a shared key, and the letter is mapped to a UTF-8 character, according to some embodiments.

Associated Advertising and Monetization Examples

In some embodiments, the system 100 may be configured to post a user's (User B) media platform content based on content posted by another user (User A). User A may desire to maximize network presence, and the system 100 may be configured to dynamically create network content on behalf of user B using network content by User A (NCA) as an argument to a function of user B's network content (NCB). For example, the following schema may be used: [@target(s)][NCB][#NCA][System url]. The system 100, may, for example, also invoke a dynamic function call to a third party/partner advertising network for a codebook related message, and User A does not have to be related to User B at all.

In some embodiments, the system 100 may be configured for interaction with various campaign management systems 146, which may, for example, manage the distribution of advertisements and/or advertising messages. For example, the system 100 may be configured to utilize a book of sponsored advertising phrases are created (one book or multiple books per sponsor), and advertising phrases may be provided which may include a link to the sponsor's selected web site.

As the encoded message is being generated by the system 100, a sponsored ad message may be selected from the book and either replaces the user chosen output or is appended to the user's message, and this message may be posted directly to the user's social feed. In some embodiments, users with "celebrity" or high-profile status have the option of charging a subscription based fee for users to read their feeds.

Encrypting the Message Mapping Table

In some embodiments, the actual mapping algorithm used to translate/map the user input message to the posted output message may itself be encrypted. For example, an encrypted mapping algorithm may typically smaller in size than the actual message and thus smaller message transfers may be enabled.

For example, this capability may be potentially useful when the channel a user desires to send the message across is constrained in size (as in Twitter for example where the max message size is 144 characters). Users with the same code books could send much larger messages back and forth, when leveraging this technique.

Email Confidentiality

In some embodiments, the system may be configured for the encoding of emails, and the system may be configured to encode different parts of an email using different keys and/or encoding techniques.

As an example in an enterprise environment, a system may be configured to be deployed to various users, and the system may be used to secure and/or encode communications that may be transmitted through publicly available email hosting servers. In this scenario, users may be grouped into various groupings, such as users on particular "projects" or "access levels". For example, the groupings may be provided by active directory (AD) services, lightweight directory access protocol (LDAP) services, etc., or profiles stored in database 120. The groupings may also be determined by, for example, the type of recipient (e.g., emails may denote various types of recipients, such as through the To:, CC:, and BCC: fields that may indicate different "need-to-know" contexts). The system may be configured to encode each composed email with a different key that is shared individually with each recipient (e.g., based on the recipient's group, need-to-know context).

In some embodiments, an email may be encoded partially, and/or different portions of an email may be encoded using different keys and/or different combinations of keys (e.g., a particular paragraph is noted to have a high "need-to-know" context, so only users noted in the 'To' field can decode the particular paragraph).

FIG. 25 illustrates an example workflow where the system is used to provide email confidentiality, according to some embodiments.

In this example, user A composes an email to user B, user C, and user D. There is a user F that is not supposed to get the email but gets included within the To: line. User B responds back to User A after reading the email, including users A, B, C, D, and F.

The system and/or clients associated with the system may be configured to always encodes messages prior to leaving the network or before sending the content to the email server. Accordingly, content decoded by an authorized user and forwarded to an unauthorized user will still remain encoded. In the scenario of this example, the system may be configured such that that the users are part of the user group and have "need-to-know" context.

When the user tries to decode the email and was not sent a copy of the key, the request for the key may be routed to an instance of the system, which may submit a key request to user A. Key requests, for example, may be configured to only be sent to the original email composer if they are part of user group. User A can approve or deny the key request.

User Interface Examples

FIGS. 26-36 are sample screenshots illustrating how an interface may be adapted for display through the user interface subsystem 102, according to some embodiments.

Various elements of information, options and advertisements may be arranged such that the elements are more visible and/or readily accessible to a user. User interface adaptations may be particularly important in relation to engaging users and providing users a simple and intuitive design workflow that may be more readily be incorporated into how the users engage in messaging, etc.

For example, steps for encoding/decoding messages requiring an excessive number of steps and/or complexity may lead to lower adoption by users, in particular, users who may not be as technically proficient as others.

Conversely, if steps for encoding and decoding messages may be incorporated as lightweight additions and/or automatic elements of a user's activities, there may be greater adoption and/or less confusion as it relates to messaging.

Similarly, there may be additional benefits in the positioning of advertisements, administrative options, purchase options (e.g., for free codebooks, paid codebooks, keys), conversation suggestions.

In some embodiments, the user interfaces are configured for integration on to various third party messaging applications and/or operating systems, such as into keyboards, as options in social media platforms, as an option available when sending messages on an email platform, etc.

Location Based Encryption/Decryption

Users may be permitted to only decrypted certain messages if they are in a geo-fenced area. The geo-fenced area may be identified using a combination of local network elements (wireless access points, routers, switches, etc. . . . ) and GPS coordinates.

Figure 37:
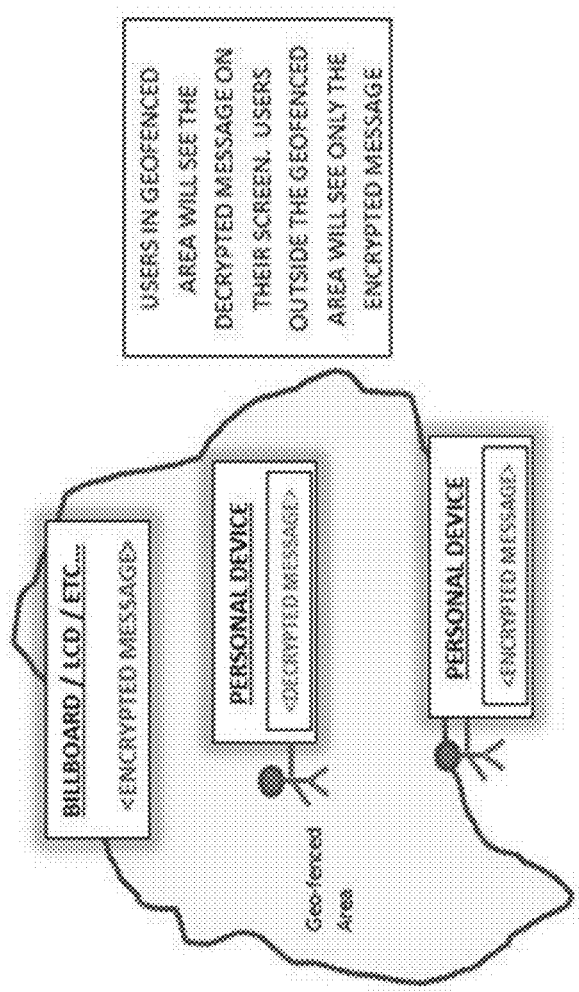
FIG. 37 is a sample illustration of such a geo-fenced area, according to some embodiments.

Other applications may be that the users information is sensitive to a location for security purposes so the key won't open if the user is in an area deemed inappropriate for that message to open. FIG. 37 is a sample illustration of such a geo-fenced area, according to some embodiments.

Some additional points or use cases include:
Sporting events where certain promotions are to be offered to people within the geo-fenced area;
Group gatherings where specific messages need to be broadcasted to a specific group (e.g., this ensures that only people located in the area of interest receive the message especially if they need to take action on something immediately (and can only do so if they are located in that area));
Users setting a reminder feature or an auto open feature that would see a message open or prompt appear when the user entered a given geo fence associated with that message;
Geo-location being used as an advertising tool, for example, being used as part of a process of unlocking coupons based on time and location;
Licenses for supported/partnered code books or replacement messages may not be available in a given market and the geo locations would account for this; and
Find me-follow me functionality around other users within a geo fence (e.g., such a feature may lead to enhanced messaging as users are more engaged).

General

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The discussion provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components.

Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

For simplicity only one computing device for implementing system 100 is shown but system 100 may include more computing devices operable by users to access remote network resources 100 and exchange data. The computing devices for implementing system 100 may be the same or different types of devices. The computing device for implementing system 100 at least one processor, a data storage device (including volatile memory or non-volatile memory or other data storage elements or a combination thereof), and at least one communication interface. The computing device components may be connected in various ways including directly coupled, indirectly coupled via a network, and distributed over a wide geographic area and connected via a network (which may be referred to as "cloud computing").

For example, and without limitation, the computing device may be a server, network appliance, set-top box, embedded device, computer expansion module, personal computer, laptop, personal data assistant, cellular telephone, smartphone device, UMPC tablets, video display terminal, gaming console, electronic reading device, and wireless hypermedia device or any other computing device capable of being configured to carry out the methods described herein.

Figure 38:
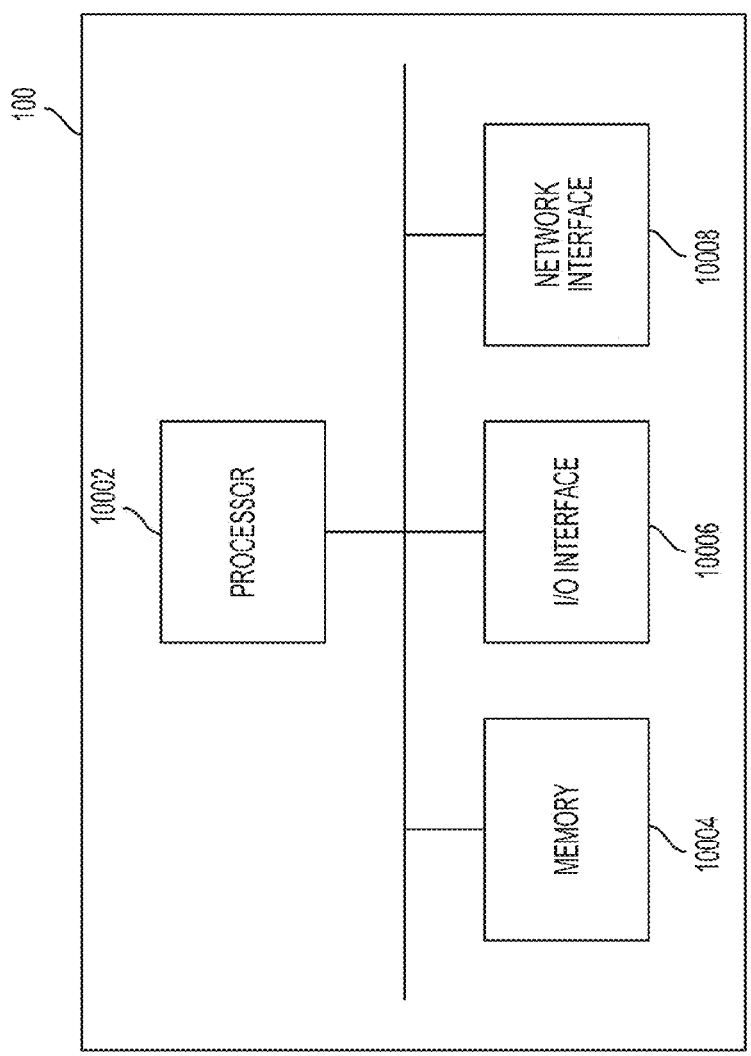
FIG. 38 is a schematic diagram of computing device for implementing the system, exemplary of an embodiment.

FIG. 38 is a schematic diagram of computing device for implementing system 100, exemplary of an embodiment. As depicted, computing device for implementing system 100 includes at least one processor 10002, memory 10004, at least one I/O interface 10006, and at least one network interface 10008.

Each processor 10002 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 10004 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 10006 enables computing device for implementing system 100 to interconnect with one or more input devices, such as a keyboard, mouse, camera, touch screen and a microphone, or with one or more output devices such as a display screen and a speaker.

Each network interface 10008 enables computing device for implementing system 100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. W-Fi, WMAX), SS7 signaling network, fixed line, local area network, wide area network, and others, including any combination of these.

Computing device for implementing system 100 is operable to register and authenticate users (using a login, unique identifier, and password for example) prior to providing access to applications, a local network, network resources, other networks and network security devices. Computing devices for implementing system 100 may serve one user or multiple users.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the examples described above and illustrated are intended to be exemplary only. The scope is indicated by the appended claims.

What is claimed is:

1. A message encoder device for generating an encoded message, the encoded message comprising a plurality of electronic characters that form one or more human-readable phrases, the message encoder device having a processor, non-transitory computer readable memory, and a data storage, the non-transitory computer readable media having instructions stored thereon, which when executed by the processor, cause the processor to:

access or receive an unencoded message string having one or more unencoded alphanumeric characters formatted based on a standard alphanumeric character set having standard alphanumeric characters, the unencoded message string having an unencoded message string length;

identify a codebook phrase string from one or more codebooks stored on the data storage based at least on matching the unencoded message string length with a length of the codebook phrase string, the codebook phrase string including a plurality of standard alphanumeric characters;

process the codebook phrase to extract one or more sets of phrase attributes including at least one of word length or character occurrence rate;

generating a first mapping table data structure mapping each of the plurality of standard alphanumeric characters of the codebook phrase string with a unique corresponding extended character of one or more extended character sets, the first mapping table data structure utilizing, for replacing repeat characters of the codebook phase string, different extended characters of the one or more extended character sets identified as having a similar rendered visual structure relative to the underlying standard alphanumeric character but having a different underlying byte code value, the first mapping data structure establishing linkages between each of the standard alphanumeric characters and the corresponding extended characters;

generating a second mapping table data structure between each of the one or more unencoded alphanumeric characters of the unencoded message string and the unique corresponding extended characters of the first mapping table data structure; and transforming the unencoded message string into a replacement text string by replacing the one or more unencoded alphanumeric characters of the unencoded message string using the second mapping table data structure to replace the unencoded alphanumeric characters with the corresponding unique extended characters, such that following replacement of all of the characters of the unencoded message string, the replacement text string is a human readable string based on the codebook phrase string;

wherein the one or more extended character sets are supersets of the standard alphanumeric character sets storing at least one of additional character variations or script-based characters, and wherein the unique extended characters are free of the standard alphanumeric characters of the standard alphanumeric character sets.

2. The message encoder device of claim 1, wherein the codebook phrase is preprocessed to replace repeating characters of the selected phrase with extended characters such that following pre-processing, the codebook phrase contains no repeating characters.

3. The message encoder device of claim 1, wherein the first mapping table data structure includes associating with each linkage of the linkages a readability factor indicative of how structurally similar an extended character is relative to the standard character upon which the extended character is mapped to, wherein structural similarity is based upon the similarity in rendered visual structure.

4. The message encoder device of claim 3, wherein the second mapping table data structure is established based at least on a minimum threshold readability factor between mapped unencoded alphanumeric characters and the corresponding unique extended characters.

5. The message encoder device of claim 1, wherein the instructions further cause the processor to construct one or more messages to be transmitted on a media network.

6. The message encoder device of claim 1, wherein the instructions further cause the processor to append one or more advertising messages on to the encoded message.

7. The message encoder device of claim 1, wherein selecting a phrase from the one or more codebooks includes scrambling the one or more codebooks by applying one or more numerical factors.

8. The message encoder device of claim 1, wherein messages or keys may be location sensitive and may not open based on an identified location.

9. The message encoder device of claim 1, wherein messages or keys may be location sensitive and may change their output based on an identified location.

10. The message encoder device of claim 1, wherein selecting one of the one or more phrases includes determining which of the one or more codebook phrases is most statistically correlated to a topic otherwise being discussed in a communication link, and selecting that codebook phrase.

11. A computer implemented method for generating an encoded message, the encoded message consisting of a plurality of electronic characters that form one or more human-readable phrases, the method comprising:
   accessing or receiving an unencoded message string having one or more unencoded alphanumeric characters formatted based on a standard alphanumeric character set having standard alphanumeric characters, the unencoded message string having an unencoded message string length;
   identifying a codebook phrase string indexed from one or more codebooks based at least on matching the unencoded message string length with a length of the codebook phrase string, the codebook pharse string including a plurality of standard alphanumeric characters;
   processing the codebook phrases to extract one or more sets of phrase attributes, including at least one of word length or character occurrence rate;
   generating a first mapping table data structure mapping each of the plurality of standard alphanumeric characters of the codebook phrase string with a unique corresponding extended character of one or more extended character sets, the first mapping table data structure utilizing, for replacing repeat characters of the codebook phase string, different extended characters of the one or more extended character sets identified as having a similar rendered visual structure relative to the underlying standard alphanumeric character but having a different underlying byte code value, the first mapping data structure establishing linkages between each of the standard alphanumeric characters and the corresponding extended characters;
   generating a second mapping table data structure between each of the one or more unencoded alphanumeric characters of the unencoded message string and the unique corresponding extended characters of the first mapping table data structure; and
   transform the unencoded message string into a replacement text string by replacing the one or more unencoded alphanumeric characters of the unencoded message string using the second mapping table data structure to replace the unencoded alphanumeric characters with corresponding extended characters, such that following replacement of all of the characters of the unencoded message string, the replacement text string is a human readable string based on the codebook phrase string;
   wherein the one or more extended character sets are supersets of the standard alphanumeric character sets storing at least one of additional character variations or script-based characters, and wherein the unique extended characters are free of the standard alphanumeric characters of the standard alphanumeric character sets.

12. The method of claim 11, wherein the selected phrase is preprocessed to replace repeating characters of the codebook phrase with extended characters such that following pre-processing, the codebook phrase contains no repeating characters.

13. The method of claim 11, wherein the first mapping table data structure includes associating with each linkage of the linkages a readability factor indicative of how structurally similar an extended character is relative to the standard character upon which the extended character is mapped to, wherein structural similarity is based upon the similarity in rendered visual structure.

14. The method of claim 13, wherein the second mapping table data structure is established based at least on a minimum threshold readability factor between mapped unencoded alphanumeric characters and the corresponding unique extended characters.

15. The method of claim 11, further comprising constructing one or more messages to be transmitted on a media network.

16. The method of claim 11, further comprising appending one or more advertising messages on to the encoded message.

17. The method of claim 11, wherein selecting a phrase from the one or more codebooks includes scrambling the one or more codebooks by applying one or more numerical factors.

18. The method of claim 11, wherein messages or keys may be location sensitive and may not open based on an identified location.

19. The method of claim 11, wherein selecting one of the one or more phrases includes determining which of the one or more phrases is most statistically correlated to a topic otherwise being discussed in a communication link, and selecting that phrase.

20. A non-transitory computer-readable media configured for using extended character sets and one or more codebooks to generate an encoded message for transmission across a communication medium, the encoded message consisting of a plurality of electronic characters that form one or more human-readable phrases, the non-transitory computer-readable media having instructions stored thereon, which when executed by a processor, cause the processor to:
   access or receive an unencoded message string having one or more unencoded alphanumeric characters formatted based on a standard alphanumeric character set having standard alphanumeric characters, the unencoded message string having an unencoded message string length;
   identify a codebook phrase from one or more codebooks based at least on matching the unencoded message string length with a length of the codebook phrase string, the codebook phrase string including a plurality of standard alphanumeric characters;
   process the codebook phrase to extract one or more sets of phrase attributes including at least one of word length or character occurrence rate;

generate a first mapping table data structure mapping each of the plurality of standard alphanumeric characters of the codebook phrase string with a unique corresponding extended character of one or more extended character sets, the first mapping table data structure utilizing, for replacing repeat characters of the codebook phase string, different extended characters of the one or more extended character sets identified as having a similar rendered visual structure relative to the underlying standard alphanumeric character but having a different underlying byte code value, the first mapping data structure establishing linkages between each of the standard alphanumeric characters and the corresponding extended characters;

generate establish a second mapping table data structure between each of the one or more unencoded alphanumeric characters of the unencoded message string and the unique corresponding extended characters of the first mapping table data structure; and transform the unencoded message string into a replacement text string by replacing the characters of the unencoded message string using the second mapping table data structure to replace the unencoded alphanumeric characters with the corresponding unique extended characters, such that following replacement of all of the characters of the unencoded message string, the replacement text string is a human readable string based on the codebook phrase string;

wherein the one or more extended character sets are supersets of the standard alphanumeric character sets storing at least one of additional character variations or script-based characters, and wherein the unique extended characters are free of the standard alphanumeric characters of the standard alphanumeric character sets.

* * * * *